US009963555B2

(12) United States Patent
Kilambi et al.

(10) Patent No.: US 9,963,555 B2
(45) Date of Patent: *May 8, 2018

(54) COMPOSITIONS COMPRISING LIGNIN

(71) Applicant: Renmatix, Inc., King of Prussia, PA (US)

(72) Inventors: Srinivas Kilambi, Duluth, GA (US); Kiran L. Kadam, Golden, CO (US)

(73) Assignee: Renmatix, Inc., King of Prussia, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/976,796

(22) Filed: Dec. 21, 2015

(65) Prior Publication Data

US 2016/0108182 A1 Apr. 21, 2016

Related U.S. Application Data

(63) Continuation of application No. 14/048,935, filed on Oct. 8, 2013, now Pat. No. 9,255,188, which is a continuation of application No. 13/472,798, filed on May 16, 2012, now Pat. No. 8,759,498.

(60) Provisional application No. 61/581,865, filed on Dec. 30, 2011.

(51) Int. Cl.
*C08G 8/04* (2006.01)
*C08G 16/02* (2006.01)
*C08H 7/00* (2011.01)
*C08G 8/20* (2006.01)
*C07G 1/00* (2011.01)

(52) U.S. Cl.
CPC ............... *C08H 6/00* (2013.01); *C07G 1/00* (2013.01); *C08G 8/20* (2013.01); *C08G 16/0293* (2013.01)

(58) Field of Classification Search
CPC .............................. C08G 8/04; C08G 16/0293
See application file for complete search history.

(56) References Cited

U.S. PATENT DOCUMENTS

| | | | |
|---|---|---|---|
| 1,783,163 A | 11/1930 | Griswold | |
| 1,938,802 A | 12/1933 | Braun | |
| 1,959,433 A | 5/1934 | Leetscher | |
| 2,156,159 A | 4/1939 | Olson | |
| 2,198,785 A | 4/1940 | Mohr | |
| 2,356,500 A | 8/1944 | Boinot | |
| 2,516,833 A | 8/1950 | Ant-Wuorinen | |
| 2,727,869 A | 6/1953 | Lambuth | |
| 2,681,871 A | 6/1954 | Wallace | |
| 2,759,856 A | 8/1956 | Saums | |
| 2,781,328 A | 2/1957 | Ayers | |
| 2,801,939 A | 8/1957 | Hignett | |
| 2,810,394 A | 10/1957 | Ferguson | |
| 2,822,784 A | 2/1958 | Heller | |
| 2,851,382 A | 9/1958 | Schmidt | |
| 2,881,783 A | 4/1959 | Andrews | |
| 2,994,633 A | 8/1961 | Clark | |
| 2,997,466 A | 8/1961 | Ball | |
| 3,212,932 A | 10/1965 | Hess | |
| 3,282,869 A | 11/1966 | Bryner | |
| 3,314,797 A | 4/1967 | Hess | |
| 3,792,719 A | 2/1974 | Dickinson | |
| 3,990,904 A | 11/1976 | Friese et al. | |
| 4,100,016 A | 7/1978 | Diebold et al. | |
| 4,105,467 A | 8/1978 | Buckl et al. | |
| 4,201,596 A | 5/1980 | Church et al. | |
| 4,308,200 A | 12/1981 | Fremont | |
| 4,316,747 A | 2/1982 | Rugg et al. | |
| 4,316,748 A | 2/1982 | Rugg et al. | |
| 4,318,748 A | 3/1982 | Church | |
| 4,338,199 A | 7/1982 | Modell | |
| 4,357,194 A | 11/1982 | Stofko | |
| 4,363,671 A | 12/1982 | Rugg et al. | |
| 4,366,322 A | 12/1982 | Raymond | |
| 4,368,079 A | 1/1983 | Rugg et al. | |
| 4,405,377 A | 9/1983 | Neuzil | |
| 4,409,032 A | 10/1983 | Paszner et al. | |
| 4,427,453 A | 1/1984 | Reitter | |
| 4,468,256 A | 8/1984 | Hinger | |
| 4,470,851 A | 9/1984 | Paszner et al. | |
| 4,493,797 A | 1/1985 | Avedesian | |
| 4,520,105 A | 5/1985 | Sinner et al. | |
| 4,535,593 A | 8/1985 | Sakka | |
| 4,543,190 A | 9/1985 | Modell | |
| 4,556,430 A | 12/1985 | Converse et al. | |
| 4,607,819 A | 8/1986 | Spils | |
| 4,612,286 A | 9/1986 | Sherman et al. | |
| 4,637,835 A | 1/1987 | Nagle | |
| 4,644,060 A | 2/1987 | Chou | |
| 4,645,541 A | 2/1987 | DeLong | |
| 4,674,285 A | 6/1987 | Durrant et al. | |

(Continued)

FOREIGN PATENT DOCUMENTS

| | | |
|---|---|---|
| AU | 2002234469 B2 | 7/2007 |
| AU | 2012250575 | 5/2012 |

(Continued)

OTHER PUBLICATIONS

Extended European Search Report dated Jul. 11, 2016 for EP 14762679.0, which was filed on Mar. 14, 2014 (Inventor—Capanema, et al. //Applicant—Renmatix, Inc. //) (6 pages).
U.S. Appl. No. 12/504,613, filed Jul. 16, 2009, Kilambi (Renmatix, Inc.), (U.S. Pat. No. 8,546,560).
U.S. Appl. No. 13/522,918, filed Jul. 18, 2012, Kilambi (Renmatix, Inc.), (2012-0291774).
U.S. Appl. No. 13/864,744, filed Apr. 17, 2013, Kilambi (Renmatix, Inc.), (U.S. Pat. No. 8,968,479).
U.S. Appl. No. 61/482,479, filed May 4, 2012, Kadam (Renmatix, Inc.).
U.S. Appl. No. 13/464,275, filed May 4, 2012, Kadam (Renmatix, Inc.), (U.S. Pat. No. 8,663,800) .

(Continued)

*Primary Examiner* — Liam J Heincer
(74) *Attorney, Agent, or Firm* — Travis B. Gasa; Andrew G. Bunn; Ballard Spahr LLP

(57) ABSTRACT

Compositions comprising lignin and low levels of undesirable impurities, such as compounds containing sulfur, nitrogen, or metals, are disclosed.

22 Claims, No Drawings

(56) References Cited

U.S. PATENT DOCUMENTS

| | | |
|---|---|---|
| 4,675,198 A | 6/1987 | Sevenants |
| 4,699,124 A | 10/1987 | Nagle |
| 4,742,814 A | 5/1988 | Sinner et al. |
| 4,764,596 A | 8/1988 | Lora et al. |
| 4,857,638 A | 8/1989 | Yalpani et al. |
| 4,946,946 A | 8/1990 | Fields et al. |
| 4,964,995 A | 10/1990 | Chum et al. |
| 5,009,746 A | 4/1991 | Hossain et al. |
| 5,041,192 A | 8/1991 | Sunol et al. |
| 5,125,977 A | 6/1992 | Grohmann et al. |
| 5,169,687 A | 12/1992 | Sunol |
| 5,196,460 A | 3/1993 | Lora et al. |
| 5,213,660 A | 5/1993 | Hossain et al. |
| 5,328,934 A | 7/1994 | Schiraldi |
| 5,338,366 A | 8/1994 | Grace et al. |
| 5,411,594 A | 5/1995 | Brelsford |
| 5,424,417 A | 6/1995 | Torget et al. |
| 5,503,996 A | 4/1996 | Torget et al. |
| 5,512,231 A | 4/1996 | Thies et al. |
| 5,516,952 A | 5/1996 | Lee et al. |
| 5,536,325 A | 7/1996 | Brink |
| 5,558,783 A | 9/1996 | McGuinness |
| 5,615,708 A | 4/1997 | Barron |
| 5,628,830 A | 5/1997 | Brink |
| 5,705,369 A | 1/1998 | Torget et al. |
| 5,788,812 A | 8/1998 | Agar et al. |
| 5,811,527 A | 9/1998 | Ishitoku et al. |
| 5,824,187 A | 10/1998 | Richter et al. |
| 5,830,763 A | 11/1998 | Junk et al. |
| 5,980,640 A | 11/1999 | Nurmi et al. |
| 6,022,419 A | 2/2000 | Torget et al. |
| 6,025,452 A | 2/2000 | Kurple |
| 6,090,291 A | 7/2000 | Akai et al. |
| 6,180,845 B1 | 1/2001 | Catallo et al. |
| 6,228,177 B1 | 5/2001 | Torget |
| 6,419,788 B1 | 7/2002 | Wingerson |
| 6,555,350 B2 | 4/2003 | Ahring et al. |
| 6,569,640 B1 | 5/2003 | Castor et al. |
| 6,642,396 B1 | 11/2003 | Zeitsch et al. |
| 6,743,928 B1 | 6/2004 | Zeitsch |
| 6,872,316 B2 | 3/2005 | Heikkila et al. |
| 6,878,212 B1 | 4/2005 | Pinatti et al. |
| 6,921,820 B2 | 7/2005 | Arai et al. |
| 6,929,752 B2 | 8/2005 | Cansell |
| 7,189,306 B2 | 3/2007 | Gervais |
| 7,238,242 B2 | 7/2007 | Pinatti et al. |
| 7,259,231 B2 | 8/2007 | Cornish et al. |
| 7,262,331 B2 | 8/2007 | van de Beld et al. |
| 7,476,296 B2 | 1/2009 | Appel et al. |
| 7,547,539 B2 | 6/2009 | Ikegami et al. |
| 7,566,383 B2 | 7/2009 | Everett et al. |
| 7,585,652 B2 | 9/2009 | Foody et al. |
| 7,649,086 B2 | 1/2010 | Belanger et al. |
| 7,666,637 B2 | 2/2010 | Nguyen |
| 7,670,813 B2 | 3/2010 | Foody et al. |
| 7,754,457 B2 | 7/2010 | Foody et al. |
| 7,771,699 B2 | 8/2010 | Adams et al. |
| 7,955,508 B2 | 6/2011 | Allan et al. |
| 7,960,325 B2 | 6/2011 | Kluko |
| 8,030,039 B1 | 10/2011 | Retsina et al. |
| 8,057,639 B2 | 11/2011 | Pschorn et al. |
| 8,119,823 B2 | 2/2012 | Kilambi |
| 8,282,738 B2 | 10/2012 | Kilambi et al. |
| 8,317,928 B1 | 11/2012 | Iyer et al. |
| 8,378,020 B1 | 2/2013 | Balakshin et al. |
| 8,404,051 B2 | 3/2013 | Iyer et al. |
| 8,663,800 B2 | 3/2014 | Kadam et al. |
| 8,759,498 B2 | 6/2014 | Kilambi et al. |
| 8,840,995 B2 | 9/2014 | Kadam et al. |
| 2001/0050096 A1 | 12/2001 | Costantini et al. |
| 2002/0061583 A1 | 5/2002 | Kawamura et al. |
| 2002/0069987 A1 | 6/2002 | Pye |
| 2003/0156970 A1 | 8/2003 | Oberkofler et al. |
| 2003/0221361 A1 | 12/2003 | Russell et al. |
| 2004/0020854 A1 | 2/2004 | Ali et al. |
| 2004/0231661 A1 | 11/2004 | Griffin et al. |
| 2005/0065336 A1 | 3/2005 | Karstens |
| 2006/0281913 A1 | 12/2006 | Ferreira et al. |
| 2007/0108036 A1 | 5/2007 | Siskin et al. |
| 2007/0148751 A1 | 6/2007 | Griffin et al. |
| 2007/0161095 A1 | 7/2007 | Gurin |
| 2007/0217980 A1 | 9/2007 | Garcia-Ortiz et al. |
| 2007/0254348 A1 | 11/2007 | Retsina et al. |
| 2007/0259412 A1 | 11/2007 | Belanger et al. |
| 2007/0267008 A1 | 11/2007 | Funazukuri et al. |
| 2008/0015336 A1 | 1/2008 | Cornish et al. |
| 2008/0029233 A1 | 2/2008 | Wingerson et al. |
| 2008/0032344 A1 | 2/2008 | Fallavollita |
| 2008/0051566 A1 | 2/2008 | Ohman et al. |
| 2008/0292766 A1 | 11/2008 | Hoffman et al. |
| 2008/0295981 A1 | 12/2008 | Shin et al. |
| 2008/0302492 A1 | 12/2008 | Shin et al. |
| 2009/0023187 A1 | 1/2009 | Foody et al. |
| 2009/0038212 A1 | 2/2009 | Cooper |
| 2009/0056201 A1 | 3/2009 | Morgan |
| 2009/0069550 A1 | 3/2009 | Belanger et al. |
| 2009/0118477 A1 | 5/2009 | Hallberg et al. |
| 2009/0176286 A1 | 7/2009 | O'Connor et al. |
| 2009/0176979 A1 | 7/2009 | Hara et al. |
| 2009/0205546 A1 | 8/2009 | Kluko |
| 2009/0221814 A1 | 9/2009 | Pschorn et al. |
| 2009/0223612 A1 | 9/2009 | McKnight et al. |
| 2009/0229599 A1 | 9/2009 | Zhang |
| 2009/0232892 A1 | 9/2009 | Yamasaki et al. |
| 2009/0288788 A1 | 11/2009 | Castor |
| 2010/0004119 A1 | 1/2010 | Gadkaree et al. |
| 2010/0012583 A1 | 1/2010 | Stuart |
| 2010/0043782 A1 | 2/2010 | Kilambi et al. |
| 2010/0048884 A1 | 2/2010 | Kilambi |
| 2010/0048924 A1 | 2/2010 | Kilambi |
| 2010/0055629 A1 | 3/2010 | McKnight et al. |
| 2010/0063271 A1 | 3/2010 | Allan et al. |
| 2010/0069626 A1 | 3/2010 | Kilambi |
| 2010/0077752 A1 | 4/2010 | Papile |
| 2010/0081798 A1 | 4/2010 | Balensiefer et al. |
| 2010/0136634 A1 | 6/2010 | Kratochvil et al. |
| 2010/0136642 A1 | 6/2010 | Belanger et al. |
| 2010/0146842 A1 | 6/2010 | Dumenil |
| 2010/0146843 A1 | 6/2010 | Dumenil |
| 2010/0152509 A1 | 6/2010 | Ekman |
| 2010/0159569 A1 | 6/2010 | Medoff et al. |
| 2010/0170504 A1 | 7/2010 | Zhang |
| 2010/0175690 A1 | 7/2010 | Nagahama et al. |
| 2010/0184151 A1 | 7/2010 | Tolan et al. |
| 2010/0203605 A1 | 8/2010 | Kim et al. |
| 2010/0233771 A1 | 9/2010 | McDonald et al. |
| 2010/0269990 A1 | 10/2010 | Dotori et al. |
| 2010/0279361 A1 | 11/2010 | South et al. |
| 2010/0305242 A1 | 12/2010 | Balakshin et al. |
| 2010/0326610 A1 | 12/2010 | Harvey et al. |
| 2010/0329938 A1 | 12/2010 | Allan et al. |
| 2010/0330638 A1 | 12/2010 | Aita et al. |
| 2011/0021743 A1 | 1/2011 | Cornish et al. |
| 2011/0076724 A1 | 3/2011 | Dumenil |
| 2011/0079219 A1 | 4/2011 | McDonald et al. |
| 2011/0100359 A1 | 5/2011 | North |
| 2011/0126448 A1 | 6/2011 | Dumenil |
| 2011/0137085 A1 | 6/2011 | Trahanovsky et al. |
| 2011/0151516 A1 | 6/2011 | Van der Heide et al. |
| 2011/0165643 A1 | 7/2011 | Retsina et al. |
| 2011/0171709 A1 | 7/2011 | Bardsley |
| 2011/0192560 A1 | 8/2011 | Heikkila et al. |
| 2011/0232160 A1 | 9/2011 | Siskin et al. |
| 2011/0237838 A1 | 9/2011 | Zmierczak et al. |
| 2011/0239973 A1 | 10/2011 | Qin |
| 2011/0253326 A1 | 10/2011 | Sherman et al. |
| 2011/0287502 A1 | 11/2011 | Castor |
| 2011/0294991 A1 | 12/2011 | Lake et al. |
| 2012/0103325 A1 | 5/2012 | Koenig et al. |
| 2012/0108798 A1 | 5/2012 | Wenger et al. |
| 2012/0116063 A1 | 5/2012 | Jansen et al. |
| 2012/0145094 A1 | 6/2012 | Simard |
| 2012/0146784 A1 | 6/2012 | Hines et al. |
| 2012/0184788 A1 | 7/2012 | Loop et al. |

(56) References Cited

U.S. PATENT DOCUMENTS

| | | | |
|---|---|---|---|
| 2012/0279496 A1 | 11/2012 | Tao | |
| 2012/0279573 A1 | 11/2012 | Simard et al. | |
| 2012/0279579 A1 | 11/2012 | Simard et al. | |
| 2012/0282465 A1 | 11/2012 | Kadam et al. | |
| 2012/0282466 A1 | 11/2012 | Iyer et al. | |
| 2012/0282467 A1 | 11/2012 | Iyer et al. | |
| 2012/0282655 A1 | 11/2012 | Gibbs | |
| 2012/0282656 A1 | 11/2012 | Gibbs | |
| 2012/0285445 A1 | 11/2012 | Kilambi et al. | |
| 2012/0291774 A1 | 11/2012 | Kilambi et al. | |
| 2012/0302699 A1 | 11/2012 | Kobune et al. | |
| 2013/0172540 A1 | 7/2013 | Simard et al. | |
| 2013/0239954 A1 | 9/2013 | Kilambi et al. | |
| 2014/0030524 A1 | 1/2014 | Kadam et al. | |
| 2014/0039144 A1 | 2/2014 | Simard et al. | |
| 2014/0275501 A1 | 9/2014 | Capanema et al. | |

FOREIGN PATENT DOCUMENTS

| | | |
|---|---|---|
| AU | 2012362936 | 12/2012 |
| AU | 2014228755 | 3/2014 |
| AU | 2012250575 B2 | 3/2015 |
| AU | 2015203521 | 6/2015 |
| BR | 1112017850-4 | 1/2011 |
| BR | 1120130281499 | 5/2012 |
| BR | 1120140159050 | 12/2012 |
| BR | 1120150233201 | 3/2014 |
| CA | 1010859 A1 | 5/1977 |
| CA | 1284637 C | 6/1991 |
| CA | 2701194 A1 | 10/2010 |
| CA | 2769746 | 1/2011 |
| CA | 2806873 | 5/2012 |
| CA | 2859752 | 12/2012 |
| CA | 2815597 | 5/2013 |
| CA | 2902733 | 3/2014 |
| CN | 1680415 A | 10/2005 |
| CN | 1931866 A | 3/2007 |
| CN | 101200479 A | 6/2008 |
| CN | 101586136 A | 11/2009 |
| CN | 101613377 A | 12/2009 |
| CN | 101613970 A | 12/2009 |
| CN | 101736631 A | 6/2010 |
| CN | 101787398 A | 7/2010 |
| CN | 101886143 A | 11/2010 |
| CN | 201180011545.7 | 1/2011 |
| CN | 201510907463.0 | 1/2011 |
| CN | 102239184 A | 11/2011 |
| CN | 2012800216170 | 5/2012 |
| CN | 2014800145564 | 3/2014 |
| CZ | 225851 | 3/1984 |
| CZ | 248106 | 1/1987 |
| DE | 3225074 A1 | 1/1984 |
| DE | 10259928 A1 | 7/2004 |
| EA | 200700715 A1 | 10/2007 |
| EP | 0037912 A2 | 10/1981 |
| EP | 98490 | 1/1984 |
| EP | 1194226 A2 | 4/2002 |
| EP | 1304412 | 4/2003 |
| EP | 1364072 A2 | 11/2003 |
| EP | 1527204 A1 | 5/2005 |
| EP | 1686192 | 8/2006 |
| EP | 1836181 A1 | 9/2007 |
| EP | 11735117.1 | 1/2011 |
| EP | 12779305.7 | 5/2012 |
| EP | 1476269.0 | 3/2014 |
| FR | 2580669 A1 | 10/1986 |
| GB | 291991 A | 6/1928 |
| GB | 692284 A | 6/1953 |
| GB | 1245486 A | 9/1971 |
| GB | 1569138 A | 6/1980 |
| GB | 2145090 A | 3/1985 |
| IN | 1836/KOLNP/12 | 1/2011 |
| IN | 3440/KOLNP/13 | 5/2012 |
| IN | 3238/KOLNP/15 | 3/2014 |
| JP | 50145537 | 11/1975 |
| JP | 56045754 | 4/1981 |
| JP | 57061083 | 4/1982 |
| JP | 62283988 | 12/1987 |
| JP | H01-158022 A | 6/1989 |
| JP | 11226385 | 8/1999 |
| JP | 2001095594 A | 4/2001 |
| JP | 2001262162 A | 9/2001 |
| JP | 2003212888 A | 7/2003 |
| JP | 2005040025 A | 2/2005 |
| JP | 2005296906 A | 10/2005 |
| JP | 2006223152 A | 8/2006 |
| JP | 2006255676 A | 9/2006 |
| JP | 2006263527 A | 10/2006 |
| JP | 2007313476 A | 12/2007 |
| JP | 2008011753 A | 1/2008 |
| JP | 2008035853 A | 2/2008 |
| JP | 2008/248202 | 10/2008 |
| JP | 04197192 B2 | 12/2008 |
| JP | 2008292018 A | 12/2008 |
| JP | 2009189291 A | 8/2009 |
| JP | 2010042604 A | 2/2010 |
| JP | 201132388 | 2/2011 |
| JP | 2014-509493 | 5/2012 |
| JP | 2014-550306 | 12/2012 |
| JP | 2016-503047 | 3/2014 |
| KR | 2009030967 | 3/2009 |
| KR | 20090039470 A | 4/2009 |
| KR | 20100032242 A | 3/2010 |
| KR | 10-13-7032018 | 5/2012 |
| KR | 10-2014-7020087 | 12/2012 |
| KR | 10-2015-7028988 | 3/2014 |
| MY | PI2013003831 | 5/2012 |
| MY | PI2014001717 | 12/2012 |
| MY | 2015002181 | 3/2014 |
| NZ | 616832 | 5/2012 |
| NZ | 713724 | 5/2012 |
| NZ | 629052 | 3/2014 |
| PH | 1-2013-502198 | 5/2012 |
| PH | 1-2014-501323 | 12/2012 |
| PH | 1205502077 | 3/2014 |
| RU | 2220245 C2 | 12/2003 |
| RU | 2338769 C1 | 11/2008 |
| RU | 2371002 C1 | 10/2009 |
| RU | 2012135497 | 1/2011 |
| RU | 2012154206 | 5/2012 |
| RU | 2012154209 | 12/2012 |
| SG | 201308087-4 | 5/2012 |
| SG | 201400849-4 | 12/2012 |
| SU | 1086046 A1 | 4/1984 |
| TH | 1301006168 | 5/2012 |
| TH | 1401003462 | 12/2012 |
| WO | WO-83/00370 A1 | 2/1983 |
| WO | WO-83/01958 A1 | 6/1983 |
| WO | WO-97/14747 A1 | 4/1997 |
| WO | WO-98/17727 A1 | 4/1998 |
| WO | WO-99/23260 A1 | 5/1999 |
| WO | WO-99/67409 A1 | 12/1999 |
| WO | WO-00/61276 A1 | 10/2000 |
| WO | WO-01/32715 A1 | 5/2001 |
| WO | WO-01/60752 A1 | 8/2001 |
| WO | WO-02/04524 | 1/2002 |
| WO | WO-02/070753 A2 | 9/2002 |
| WO | WO-2004/013409 A1 | 2/2004 |
| WO | WO-2007/009463 A2 | 1/2007 |
| WO | WO-2007/056701 A2 | 5/2007 |
| WO | WO-2007/120210 A2 | 10/2007 |
| WO | WO-2008/026932 A1 | 3/2008 |
| WO | WO-2008/036500 A2 | 3/2008 |
| WO | WO-2008/050740 A1 | 5/2008 |
| WO | WO-2008/121043 A1 | 10/2008 |
| WO | WO-2008/143078 A1 | 11/2008 |
| WO | WO-2009/015409 A1 | 2/2009 |
| WO | WO-2009/060126 A1 | 5/2009 |
| WO | WO-2009/108773 A2 | 9/2009 |
| WO | WO-2010/009343 A2 | 1/2010 |
| WO | WO-2010/034055 A1 | 4/2010 |
| WO | WO-2010/045576 A2 | 4/2010 |
| WO | WO-2010/046532 A1 | 4/2010 |
| WO | WO-2010/069516 A2 | 6/2010 |

(56) References Cited

FOREIGN PATENT DOCUMENTS

| | | |
|---|---|---|
| WO | WO-2010/113129 A2 | 10/2010 |
| WO | WO-2010/121367 A1 | 10/2010 |
| WO | PCT/US11/021726 | 1/2011 |
| WO | WO-2011/002822 A1 | 1/2011 |
| WO | WO-2011/007369 A1 | 1/2011 |
| WO | WO-2011/091044 A1 | 7/2011 |
| WO | WO-2011/094859 A1 | 8/2011 |
| WO | WO-2011/099544 A1 | 8/2011 |
| WO | PCT/US12/036591 | 5/2012 |
| WO | WO0201305632 | 5/2012 |
| WO | WO-2012/151509 A2 | 11/2012 |
| WO | WO-2012/151521 A2 | 11/2012 |
| WO | WO-2012/151524 A2 | 11/2012 |
| WO | WO-2012/151526 A2 | 11/2012 |
| WO | WO-2012/151529 A2 | 11/2012 |
| WO | WO-2012/151531 A2 | 11/2012 |
| WO | WO-2012/151536 A2 | 11/2012 |
| WO | PCT/US12/067535 | 12/2012 |
| WO | WO-2013/101397 A1 | 7/2013 |
| WO | PCT/US14/029284 | 3/2014 |
| ZA | 2013/09032 | 5/2012 |

OTHER PUBLICATIONS

U.S. Appl. No. 14/045,327, filed May 4, 2012, Kadam (Renmatix, Inc.), (U.S. Pat. No. 8,840,995).
U.S. Appl. No. 61/581,865, filed Dec. 30, 2011, Kadam (Renmatix, Inc.).
U.S. Appl. No. 13/472,798, filed May 16, 2012, Kilambi (Renmatix, Inc.), (U.S. Pat. No. 8,759,498).
U.S. Appl. No. 14/048,935, filed Oct. 8, 2013, Kilambi (Renmatix, Inc.), (U.S. Pat. No. 9,255,188).
U.S. Appl. No. 61/802,087, filed Mar. 15, 2013, Capanema (Renmatix, Inc.).
U.S. Appl. No. 14/213,680, filed Mar. 15, 2014, Capanema (Renmatix, Inc.), (2014/0275501).
"Evaluation of materials for use in letdown valves and coal feed pumps for coal liquefaction service", Electr Power Res Inst Rep EPRIAF, No. 579, 1978, 94 (Abstract).
"Evaluation of materials for use in letdown valves for coal liquefaction service", Annual Conference on Materials for Coal Conversion and Utilization (Conf-791014), Oct. 9-11, 1979 (Abstract).
"Lignin and its properties", Dialogue/Newsletters, vol. 9, No. 1, Lignin Institute, Jul. 2001.
"Merriam-Webster Dictionary, "Quench-Definition"", document available at: <http://www.merriam-webster.com/dictionary/quench>, Retrieved on Feb. 9, 2012, Feb. 2, 2012, 1.
"The Alternative Energy Magazine", http://www.altenergymag.com/emagazine/2009/06/lignin-as-alternativerenewable-fuel/1384), retrieved from the internet at least as early as May 16, 2012.
Adler, E. 1977. "Lignin chemistry—Past, present and future," Wood Sci. Technol. 11, 169-218.
Adler, E., et al. 1987. "Investigation of the acid-catalyzed alkylation of lignins by means of NMR spectroscopic methods," Holzforschung, 41, 199-207.
Adschiri et al., "Cellulose hydrolysis in supercritical water to recover chemicals", Reaction Engineering for Pollution Prevention, 2000, 205-220.
Adschiri et al., "Noncatalytic Conversion of Cellulose in Supercritical and Sub-Critical Water", Journal of Chemical Engineering of Japan, 1993, 26(6): 676-680.
Akiyama, T., et al. 2005. "Erythro/threo ratio of β-O-4 structures as an important structural characteristic of lignin. Part IV. Variation in erythro/threo ratio in softwood and hardwood lignins and its relation to syringyl/guaiacyl ratio," Holzforschung, 59, 276-281.
Arai et al., "Biomass conversion in supercritical water for chemical recycle", Enerugi, Shigen, 16(2), 1995, 175-180 (Abstract).
Argyropoulos, D. 2010. "Heteronuclear NMR spectroscopy of lignins." In: Lignin and Lignins: Advances in Chemistry. Heitner, C., Dimmel, D. & Schmidt, J. Eds., CRC Press, Boca Raton, London, New York, 245-265.

Baek et al., "Optimization of the pretreatment of rice straw hemicellulosic hydrolyzates for microbial production of xylitol", Biotechnology and Bioprocess Engineering, 12(4), 2007, 404-409(Abstract).
Balakshin, M., et al. 2003. "Elucidation of the structures of residual and dissolved pine kraft lignins using an HMQC technique," J. Agric. Food Chem., 51, 6116-6127.
Balakshin, M., et al. 2007. "MWL fraction with a high concentration of lignin-carbohydrate linkages: Isolation and 2D NMR spectroscopic analysis," Holzforschung, 61, 1-7.
Balakshin, M., et al. 2008. "Recent advances in isolation and analysis of lignins and lignin-carbohydrate complexes." In: Characterization of Lignocellulosic Materials, Hu, T. Q., Ed., Blackwell, Oxford, UK, 148-170.
Balakshin, M., et al. 2011. "Quantification of lignin-carbohydrate linkages with high-resolution NMR spectroscopy," Planta, 233, 1097-1110.
Balhouse, "Design, fabrication, and evaluation of a spiral-flow letdown valve", Electric Power Research Institute, Advanced Power Systems Division, EPRI AP, 1981(Abstract).
Ballesteros et al., "Fractionation of Cynara cardunculus (cardoon) biomass by dilute-acid pretreatment", Applied Biochemistry and Biotechnology, 137-140, 2007, 239-252 (Abstract).
Baumberger, S., et al. 2007. "Molar mass determination of lignins by size-exclusion chromatography: towards standardization of the method," Holzforschung 61, 459-468.
Beauchet, R., et al. 2012. "Conversion of lignin to aromatic-based chemical (L-chems) and biofuels (L-fuels)," Bioresource Technology, 121, 328-334.
Bennett et al., "Chemicals from Forest Products by Supercritical Fluid Extraction", Fluid Phase Equil., 1983, 10:337.
Berlin, A., et al. 2006. "Inhibition of cellulase, xylanase and α-glucosidase activities by softwood lignin preparations," Journal of Biotechnology, 125,198-209.
Berlin, A., et al. 2014. "Industrial lignins: Analysis, properties and applications." In: Bioenergy Research: Advances and Applications. Gupta V. K., Kubicek, C. P., Saddler, J., Xu, F. & Tuohy, M., Eds., Elsevier, 315-336.
Bicker et al., "Catalytic conversion of carbohydrates in subcritical water: A new chemical process for lactic acid production", Journal of Molecular Catalysis A: Chemical, 2005, 239:151-157.
Bobleter, "Hydrothermal Degradation and Fractionation of Saccharides and Polysaccharides", 1998.
Boerjan, et al., "Lignin biosynthesis", Ann. Rev. Plant Bio., 54(1), Jun. 2003,519-549.
Boocock et al., "Liquefaction of Biomass by Rapid Hydrolysis", Can. J. Chem. Eng., 1983, 61:80.
Bustos et al., "Modeling of the hydrolysis of sugar cane bagasse with hydrochloric acid", Applied Biochemistry and Biotechnology, 104(1), 2003, 51-68 (Abstract).
Capanema, E., et al. 2001. "Structural analysis of residual and technical lignins by 1H-13C correlation 2D NMR-spectroscopy," Holzforschung, 55(3), 302-308.
Capanema, E., et al. 2004. "A comprehensive approach for quantitative lignin characterization by NMR spectroscopy," J. Agric. Food Chem., 52, 1850-1860.
Capanema, E., et al. 2004. "An improved procedure for isolation of residual lignins from hardwood kraft pulps," Holzforschung, 58, 464-472.
Capanema, E., et al. 2005. "Isolation and characterization of residual lignins from hardwood pulps: Method improvements," Proc. 13th ISWFPC, Auckland, New Zealand, v.III, 57-64.
Capanema, E., et al. 2005. "Quantitative characterization of a hardwood milled wood lignin by NMR spectroscopy," J. Agric. Food Chem., 53, 9639-9649.
Capanema, E., et al. 2008. "Quantitative analysis of technical lignins by a combination of 1H-13C HMQC and 13C NMR methods," Proceedings of International Conference on Pulping, Papermaking and Biotechnology, 647-651.
Capanema, E., et al. 2015. "How well do MWL and CEL preparations represent the whole hardwood lignin?" Journal of Wood Chemistry & Technology, 35, 17-26.

(56) References Cited

OTHER PUBLICATIONS

Carrasco et al., "Effects of dilute acid and steam explosion pretreatments on the cellulose structure and kinetics of cellulosic fraction hydrolysis by dilute acids in lignocellulosic materials", Applied Biochemistry and Biotechnology, 45-46, 1994,23-34 (Abstract).
Carrasco et al., "SO2-catalyzed steam pretreatment and fermentation of enzymatically hydrolyzed sugarcane bagasse", Enzyme and Microbial Technology, 46(2), 2010, 64-73 (Abstract).
Carvalho et al., "Sugarcane bagasse hydrolysis with phosphoric and sulfuric acids and hydrolysate detoxification for xylitol production", Journal of Chemical Technology and Biotechnology, 79(11), 2004, 1308-1312 (Abstract).
Cateto, C., et al. 2008. "Lignins as macromonomers for polyurethane synthesis: A comparative study on hydroxyl group determination," Journal of Applied Polymer Science, 109(5), 3008-3017.
Chamblee et al., "Reversible in situ acid formation for .beta.—pinene hydrolysis using CO2 expanded liquid and hot water", Green Chemistry, 2004, vol. 6, 382-386.
Chen et al., "Study on dilute-acid pretreatment of corn stalk", Linchan Huaxue Yu Gongye, 29(2), 2009, 27-32 (Abstract).
Conner, et al., "Carbohydrate Modified Phenol-Formaldehyde Resins", vol. 6(4), 1986, 591-613.
Converti et al., "Wood hydrolysis and hydrolyzate detoxification for subsequent xylitol production", Chemical Engineering & Technology, 23(11), 2000, 1013-1020 (Abstract).
Dias et al., "Dehydration of xylose into furfural over micro-mesoporous sulfonic acid catalysts", Journal of Catalysis, 2005, vol. 229, 414-423.
Do Egito De Paiva et al., "Optimization of D-xylose, L-arabinose and D-glucose production obtained from sugar cane bagasse hydrolysis process", Brazilian Symposium on the Chemistry of Lignins and Other Wood Components, 6th, 2001, 333-337 (Abstract).
Dogaris et al., "Hydrothermal processing and enzymatic hydrolysis of sorghum bagasse for fermentable carbohydrates production", Bioresource Technology, 100(24), 2009, 6543-6549 (Abstract).
Eckert et al., "Supercritical fluid processing", Environmental Science and Technology, 1986, 20: 319-325.
Ehara , "Chemical conversion of woody biomass by supercritical water", Graduate School of Energy Science, Kyoto University, Kyoto Japan.
Ehara et al., "A comparative study on chemical conversion of cellulose between the batch-type and flow-type in supercritical water", Cellulose, 2002, vol. 9, 301-311.
Ehara et al., "Decomposition behavior of cellulose in supercritical water, subcritical water, and their combined treatments", J. Wood Sci., vol. 51, 2005, 148-153.
Ehara, et al., "Characterization of the lignin-derived products from wood as treated in supercritical water", Journal of Wood Science, vol. 48, No. 4, Aug. 2002, pp. 320-325.
Ehrman , "Methods for the chemical analysis of biomass process streams", Handbook on Bioethanol, 1996, 395-415.
Ehrman, "Methods for the chemical analysis of biomass process streams", Handbook on Bioethanol, 1996, 395-415.
Erzengin et al., "Liquefaction of Sunflower Stalk by Using Supercritical Extraction", Energy Conversion and Management, Elsevier Science Publishers, Oxford, GB, Aug. 1998, 39:11, 1203-1206.
Evtuguin, D. V., et al. 2001. "Comprehensive study on the chemical structure of dioxane lignin from plantation Eucalyptus globulus wood," J. Agric. Food Chem. 49, 4252-4261.
Faix, O., et al. 1994. "Determination of hydroxyl groups in lignins. Evaluation of 1 H-, 13C-, 31 P-NMR, FTIR and wet chemistry methods," Holzforschung 48, 387-394.
Fujimoto, A. et al. 2005. "Quantitative evaluation of milling effects on lignin structure during the isolation process of milled wood lignin," J. Wood Sci., 51, 89-91.
Garrote et al., "Manufacture of xylose-based fermentation media from corncobs by posthydrolysis of autohydrolysis liquors", Applied Biochemistry and Biotechnology, 95(3), 2001, 195-207 (Abstract).
Geddes et al., "Optimizing the saccharification of sugar cane bagasse using dilute phosphoric acid followed by fungal celluloses", Bioresource Technology, 101(6), 2010, 1851-1857 (Abstract).
Gellerstedt, G. & Robert, D. 1987. "Quantitative 13C NMR analysis of kraft lignins," Acta Chemica Scandinavica B41, 541-546.
Gellerstedt, G. 1996. "Chemical structure of pulp components." In: Pulp Bleaching: Principles and Practice, Dence, C. W. & Reeve, D. W. Eds., Tappi, 91-111.
Gierer, J. 1980. "Chemical aspects of kraft pulping," Wood Sci. Technol. 14, 241-266.
Glasser, et al. 1983. "The chemistry of several novel bioconversion lignins," J. Agric. Food Chem., 31, 921-930.
Glasser, W. 2000. "Classification of lignin according to chemical and molecular structure." In: Lignin: Historical, Biological, and Materials Perspectives. W. Glasser, R. Northey & T., Eds., Schultz. Washington, DC, 216-238.
Gong et al., "Study on hydrolysis and saccharification of microcrystalline cellulose in supercritical water", Xiandai Huagong, 30(2), 2010, 44-47 (Abstract).
Gosselink, R., et al. 2010. "Fractionation, analysis, and PCA modeling of properties of four technical lignins for prediction of their application potential in binders," Holzforschung 64(2), 193-200.
Granata, A. & D. Argyropoulos. 1995. "2-Chloro-4,4,5,5-tetramethyl-1,3,2-dioxaphospholane, a reagent for the accurate determination of the uncondensed and condensed phenolic moieties in lignins," Journal of Agricultural and Food Chemistry 43(6), 1538-1544.
Guerra, A., et al. 2006. "Comparative evaluation of three lignin isolation protocols for various wood species," J. Agric. Food Chem. 54, 9696-9705.
Guirong et al., "Cellulose decomposition behavior in hot-compressed aprotic solvents", Science in China Series B: Chemistry, May 2008, vol. 51, No. 5, 479-486.
Hamelinck et al., "Ethanol from lignocellulosic biomass: techno-economic performance in short-, middle- and long-term", Biomass and Bioenergy, vol. 28, 2005, 384-410.
Harmer et al., "A new route to high yield sugars from biomass: phosphoric-sulfuric acid", Chemical Communications, vol. 43, 2009, 6610-6612 (Abstract).
Helm, R. F. 2000. "Lignin-polysaccharide interactions in woody plants." In: Lignin: Historical, Biological, and Materials Perspectives, Glasser, W., Northey, R., Schultz, T., Eds., ACS Symp. Series 742, Washington, DC, 161-171.
Herrera et al., "Production of Xylose from Sorghum Straw Using Hydrochloric Acid", Journal of Cereal Science, 37(3), 2003, 267-274 (Abstract).
Holgate et al., "Glucose Hydrolysis and Oxidation in Supercritical Water", AIChE Journal, 1995, 41(3), 637-648.
Holtman, et al. 2006. "Quantitative 13C NMR characterization of milled wood lignins isolated by different milling techniques," Journal of Wood Chemistry and Technology, 26(1), 21-34.
Hosaka , "Filtration of lignin in hydrolysis solution", Hiroshima Daigaku Suichikusangakubu Kiyo, 17(1), 1978, 17-25 (Abstract).
Houghton et al., "Reactivity of Some Organic Compounds with Supercritical Water", Fuel, 1986, 61:827.
http://www.astm.org/Standards/ E1755.htm, retrieved from the internet at least as early as May 16, 2012.
International Patent Application No. PCT/US2012/067535, "International Search Report and Written Opinion Received", Feb. 20, 2013, 10 pages.
Ioannidou et al., "Direct determination of toxic trace metals in honey and sugars using inductively coupled plasma atomic emission spectrometry", Talanta, 65(1), 2005, 92-97.
Jensen et al., "Effects of dilute acid pretreatment conditions on enzymatic hydrolysis monomer and oligomer sugar yields for aspen, balsam, and switch grass", Bioresource Technology, 101(7), 2010, 2317-2325 (Abstract).
Jeong et al., "Optimizing dilute-acid pretreatment of rapeseed straw for extraction of hemicellulose", Applied Biochemistry and Biotechnology, 161(1-8), 2010, 22-33 (Abstract).

(56) References Cited

OTHER PUBLICATIONS

Jiang et al., "A method for quick analysis of biomass chemical composition from element analysis", Huagong Xuebao (Chinese Edition), 61(6), 2010, 1506-1509 (Abstract).
Jiang, et al., "A method for quick analysis of biomass chemical composition from element analysis", Huagong Xuebao (Chinese Edition), 61(6), 2010, 1506-1509.
Kamada et al., "Development of letdown valve on pilot plant", Sekitan Kagaku Kaigi Happyo Ronbunshu, 35th, 1998, 459-462 (Abstract).
Kamm et al., "Principles of bio-refineries", Appl. Microbiol. Biotechnol, vol. 64., 2004, 137-145.
Karimi et al., "Conversion of rice straw to sugars by dilute-acid hydrolysis", Biomass and Bioenergy, 30(3), 2006, 247-253 (Abstract).
Kim et al., "Selective Synthesis of Furfural from Xylose with Supercritical Carbon Dioxide and Solid Acid Catalyst", Journal of Industrial and Engineering Chemistry, The Korean Society of Industrial and Engineering Chemistry, Korea, 2001, 7(6);424-429.
Kirk-Othmer, "Supercritical Fluids", Encyclopedia of Chemical Technology 3rd ed., John Wiley & Sons, New York.
Knopf et al., "Reactive Extraction of Lignin from Biomass Using Supercritical Ammonia-Water Mixtures", J. Supercritical Fluids, 1993, 6: 249-254.
Korean Intellectual Property Office, International Search Report and Written Opinion in International Patent Application No. PCT/US2012/067535 (dated Feb. 20, 2013).
Koshijima, T., et al. 2003. Association between lignin and carbohydrates in wood and other plant tissues. Springer-Verlag, Berlin/Heidelberg/New York.
Kostukevich, N., et al. 1993. "Determination of the hydroxyl containing functional groups of the oxygen-acetic lignins by 31P NMR spectroscopy," Proceedings of the 7th International Symposium on Wood and Pulping Chemistry, Beijing, China, 503-507.
Kupianen et al., "Comparison of formic and sulfuric acids as a glucose decomposition catalyst", Ind. Eng. Chem. Res., 49(18), 2010, 8444-8449 (Abstract).
Lawoko, M., et al. 2005. "Structural differences between the lignin-carbohydrate complexes in wood and in chemical pulps," Biomacromolecules, 6, 3467-3473.
Lee et al., "Hydrolysis of cellulose under subcritical and supercritical water using continuous flow system", Hwahak Konghak, 39(2), 2001, 257-263 (Abstract).
Levai, "Atom spectrometric methods for determination of trace metal impurities in pharmaceutical substances", Acta Pharmaceutica Hungarica, 71(3), 2001, 350-356 (Abstract).
Li, "Analysis of failure cause in CCl pressure reducing valves used in product pipeline", Guandao Jishu Yu Shebei, (5), 2008, 34-36 (Abstract).
Li et al., "Fructose decomposition kinetics in organic acids-enriched high temperature liquid water", Biomass and Bioenergy, vol. 33, Issue 9, Sep. 2009, 1182-1187.
Li et al., "Improvement on technology of extracting xylose from the corncobs by acid method", Shipin Gongye Keji, 30(6), 2009, 263-264 (Abstract).
Li et al., "Interaction of Supercritical Fluids with Lignocellulosic Materials", Industrial and Engineering Chemistry Research, 1988, 27(7): 1301-1312.
Li et al., "Studies of Monosaccharide Production through Lignocellulosic Waste Hydrolysis Using Double Acids", Energy & Fuels, 22(3), 2008, 2015-2021 (Abstract).
Li et al., "Study on the recovery of lignin from black liquor by ultrafiltration", Huaxue Gongcheng, 31(1), 2003, 49-52 (Abstract).
Li, J., et al. 2009. "Steam explosion lignins; their extraction, structure and potential as feedstock for biodiesel and chemicals," Bioresource Tech., 100, 2556-2561.
Liitia, T. M., et al. 2003. "Analysis of technical lignins by two- and three-dimensional NMR spectroscopy," J. Agric Food Chem., 51, 2136-2143.
Lin, S. & C. Dence. 1992. Methods of Lignin Chemistry. Springer-Verlag, Heidelberg/Berlin/New York.
Lloyd et al., "Combined sugar yields for dilute sulfuric acid pretreatment of corn stover followed by enzymatic hydrolysis of the remaining solids", Bioresource Technology, 96(18), 2005, 1967-1977 (Abstract).
Lopez et al., "Chemical characterization and dilute-acid hydrolysis of rice hulls from an artisan mill", BioResources, 5(4), 2010, 2268-2277 (Abstract).
Lora, J. 2008. "Industrial commercial lignins: Sources, properties and applications." In: Monomers, Polymers and Composites from Renewable Resources, Belgacem, M., and Gandini, A. Eds., Elsevier, Oxford, UK, 225-241.
Lora, J. H. & Glasser, W.G. 2002. "Recent industrial applications of lignin: A sustainable alternative to nonrenewable materials," Journal of Polymers and the Environment, 10, 39-48.
Lu et al., "Decomposition of Cellulose to Produce 5-hydroxymethyl-furaldehyde in Subcritical Water", Abstract of Transactions of Tranjin University, STN Accession No. 2008:1016799, Document No. 151:427986, 2008, 14(3), 198201.
Lu et al., "Optimization of $H_2SO_4$—catalyzed hydrothermal pretreatment of rapeseed straw for bioconversion to ethanol: focusing on pretreatment at high solids content", Bioresource Technology, 100(12), 2009, 3048-3053 (Abstract).
Luterbacher et al., "High-Solids Biphasic $CO_2$-$H_2O$ Pretreatment of Lignocellulosic Biomass", Biotechnology and Bioengineering, 107(3), 2010, 451-460 (Abstract).
Malaluan et al., "Biomass conversion in supercritical water", Off. Proc. Comb. Conf., 6th Conf. Asia Pac. Confed. Chem. Eng., 21st Australas. Chem. Eng. Conf., vol. 1 (Publisher: Inst. Eng., Aus., Barton, Australia), 1993, 209/1-214/1 (Abstract).
Mansouri, N., et al. 2006. "Structural characterization of technical lignins for the production of adhesives: Application to lignosulfonate, kraft, soda-anthraquinone, organosolv and ethanol process lignins," Industrial Crops and Products, 24(1), 8-16.
Mao, J. Z., et al. 2012. "Fractional and structural characterization of alkaline lignins from carex meyeriana Kunth," Cellulose Chemistry and Technology, 46(3), 193-205.
Marchessault et al., "A New Understanding of the Carbohydrate System", Future Sources of Organic Raw Materials, 1980, 613-625.
Marone et al., "Commination of hydrolytic lignin in a jet mill", Gidroliznaya i Lesokhimicheskaya Promyshlennost, (6), 1991, 14-15 (Abstract).
Marton, J. 1971. "Reaction in alkaline pulping." In: Lignins: Occurrence, formation, structure and reactions. Sarkanen, K. V. & Ludvig C. H., Eds., Wiley—Interscience, New York, 639-694.
Matsumura et al., "Supercritical Water Treatment of Biomass for Energy and Material Recovery", Combust. Sci. and Tech., 2006, 178:509-536.
Matsunaga et al., "Super-rapid chemical conversion of sugi wood by supercritical and subcritical water treatment", Mokuzai Gakkaishi, 50(5), 2004, 325-332 (Abstract).
McCoy et al., "Extraction of Lignin from Biomass with Supercritical Alcohol", J. Supercritical Fluids, 1989, 2:80-84.
McHugh et al., "Supercritical Fluid Extraction : Principles and Practice", Butterworths, 1986, pp. 293-310.
McWilliams et al., "Comparison of aspen wood hydrolysates produced by pretreatment with liquid hot water and carbonic acid", Applied Biochemistry and Biotechnology, 98-100, 2002, 109-121 (Abstract).
Miller-lhli et al., "Direct determination of lead in sugars using graphite furnace atomic absorption spectrometry", Atomic Spectroscopy, 14(4), 1993, 85-9.
Milne, T., et al. 1992. "Standardized analytical methods," Biomass & Bioenergy 2(1-6), 341-366.
Miyazawa et al., "Polysaccharide Hydrolysis Accelerated by Adding Carbon Dioxide under Hydrothermal Conditions", Biotechnol. Prog., 2005, 21: 1782-1785.
Modell et al., "Supercritical Water Oxidation of Pulp Mill Sludges", Tappi J., 1992, 75:195.
Mok et al., "Dilute acid hydrolysis of biopolymers in a semi-batch flow reactor at supercritical pressure", Energy from Biomass and Wastes, 13, 1990, 1329-1347 (Abstract).

(56) References Cited

OTHER PUBLICATIONS

Moreschi et al., "Hydrolysis of Ginger Bagasse Starch in Subcritical Water and Carbon Dioxide", Journal of Agricultural and Food Chemistry, 2004, 52(6), 1753-1758.
Mosier et al., "Characterization of Acid Catalytic Domains for Cellulose Hydrolysis and Glucose Degradation", Biotechnology and Bioengineering, vol. 79, No. 6, Sep. 20, 2002, 610-618.
Mosier et al., "Optimization of pH controlled liquid hot water pretreatment of corn stover", Bioresource Technology, 96(18), 2005, 1986-1992 (Abstract).
Nakata et al., "Bioethanol from cellulose with supercritical water treatment followed by enzymatic hydrolysis", Applied Biochemistry and Biotechnology, 129-132, 2006, 476-485 (Abstract).
Napradean et al., "Studies regarding cadmium determination by atomic absorption spectrometry. Note II. Pharmaceutical finished products", Farmacia, 53(2), 2005, 86-90 (Abstract).
Neureiter et al., "(Abstract) Dilute-acid hydrolysis of sugarcane bagasse at varying conditions", Applied Biochemistry and Biotechnology, 98-100, 2002, 49-58 (Abstract).
Neureiter et al., "Dilute acid hydrolysis of press cakes from silage and grass to recover hemicellulose-derived sugars", Bioresource Technology, 92(1), 2004, 21-29 (Abstract).
Nunn, et al., "Product compositions and kinetics in the rapid pyrolysis of milled wood lignin", Industrial & Engineering Chemistry Process Design and Development, vol. 24, Jul. 1985, pp. 844-852.
Ogihara et al., "Direct observation of cellulose dissolution in subcritical and supercritical water over a wide range of water densities (500-1000 kg/m3)", Cellulose, 2005, 12:595-606.
Ohra-aho, T., et al. 2013. "S/G ratio and lignin structure among Eucalyptus hybrids determined by Py-GC/MS and nitrobenzene oxidation," Journal of Analytical and Applied Pyrolysis, 101, 166-171.
Osada et al., "Low Temperature Catalytic Gasification of Lignin and Cellulose with a Ruthenium Catalyst in Supercritical Water", Energy Fuels, 2004, 18: 327-333.
Parajo et al., "Pre-hydrolysis of Eucalyptus wood with dilute sulfuric acid: operation in autoclave", Holz als Roh- and Werkstoff, 52(2), 1994, 102-8 (Abstract).
Park et al., "Kinetics of cellulose decomposition under subcritical and supercritical water in continuous flow system", Korean Journal of Chemical Engineering, 19(6), 2002, 960-966 (Abstract).
Pasquini et al., "Extraction of lignin from sugar cane bagasse and Pinus taeda wood chips using ethanol-water mixtures and carbon dioxide at high pressures", Journal of Supercritical Fluids, PRA Press, US, Nov. 2005, 36(1); 31-39.
Pasquini et al., "Sugar cane bagasse pulping using supercritical CO2 associated with co-solvent 1-butanol/water", J. of Supercritical Fluids, vol. 34, 2005, 125-134.
Persson et al., "Supercritical Fluid Extraction of a Lignocellulosic Hydrolysate of Spruce for Detoxification and to Facilitate Analysis of Inhibitors", Biotechnology and Bioengineering, Wiley & Sons, Hoboken, NJ, US, Sep. 20, 2002, 79(6): 694-700.
Pessoa, Jr. et al., "Acid hydrolysis of hemicellulose from sugarcane bagasse", Brazilian Journal of Chemical Engineering, 14(3), 1997, 291-297 (Abstract).
Peter et al., "High Pressure Extraction of Lignin from Biomass", Supercritical Fluid Technology, 1985, p. 385.
Pohl et al., "Direct determination of the total concentrations of magnesium, calcium, manganese, and iron in addition to their chemical and physical fractions in dark honeys", Analytical Letters, 44(13), 2011, 2265-2279.
Pu, Y., et al. 2011. "Application of quantitative 31P NMR in biomass lignin and biofuel precursors characterization," Energy & Environmental Science, 4, 3154-3166.
Ralph, J., et al. 2004. "Lignins: natural polymers from oxidative coupling of 4-hydroxphenylpropanoids," Phytochem. Rev. 3, 29-60.
Ramirez et al., "Mathematical modeling of feed pretreatment for bioethanol production", Computer-Aided Chemical Engineering, vol. 26, 2009, 1299-1304 (Abstract).
Rao et al., "Pyrolysis Rates of Biomass Materials", Energy, 1998, 23:973-978.
Raplh, et al., "Elucidation of new structures in lignins of CAD- and COMT—deficient plants by NMR", Phytochem. 57(6), 2001, 993-1003.
Robert, D., et al. 1988. "Structural changes in aspen lignin during steam explosion treatment," Cellulose Chem. Techn., 22, 221-230.
Roberto et al., "Dilute-acid hydrolysis for optimization of xylose recovery from rice straw in a semi-pilot reactor", Industrial Crops and Products, 17(3), 2003, 171-176 (Abstract).
Saito et al., "The Investigation of Degradation Reaction of Various Saccharides in High Temperature and High Pressure Water", Journal of Physics: Conference Series, 2008, 121.
Saka , "Supercritical fluids to biomass research", Cellulose Communications, 5(3), 1998, 129-135 (Abstract).
Saka et al., "Chemical conversion of biomass resources to useful chemicals and fuels by supercritical water treatment", Bridgewater AV(ed) Progress in Thermocritical Biomass Conversion. Blackwell, Oxford, 2001, 1338-1348.
Saka et al., "Chemical conversion of various celluloses to glucose and its derivatives in supercritical water", Cellulose Communications, 6(3), 1999, 177-191.
Saka et al., "Supercritical fluids to biomass research (II)", Cellulose Communications, 9(3), 2002, 137-143 (Abstract).
Sakakibara, A. 2001. "Chemistry of lignin." In: Wood and Cellulose Chemistry. Hon, D.N.-S., Shiraishi, N., Eds., Marcel Dekker Inc., New York, 109-173.
Sako , "Kinetic study of furfural formation accompanying supercritical carbon dioxide extraction", Journal of Chemical Engineering of Japan, Society of Chemical Engineers, Aug. 1, 1992, 25(4):372-377.
Sanchez et al., "Dilute-acid hydrolysis for fermentation of the Bolivian straw material Paja Brava", Bioresource Technology, 93(3), 2004, 249-256 (Abstract).
Sangarunlert et al., "Furfural production by acid hydrolysis and supercritical carbon dioxide extraction from rice husk", Korean Journal of Chemical Engineering, 2007, 24(6): 936-941.
Santos, R., et al. 2012. "Lignin structural variations in hardwood species," J. Agric. Food Chem., 60, 4923-4930.
Sarrouh et al., "Biotechnological production of xylitol: enhancement of monosaccharide production by post-hydrolysis of dilute acid sugarcane hydrolysate", Applied Biochemistry and Biotechnology, 153(1-3), 2009, 163-170 (Abstract).
Sasaki et al., "Cellulose Hydrolysis in Sub-Critical and Supercritical Water", Journal of Supercritical Fluids, 1998, 13:261-268.
Sasaki et al., "Direct hydrolysis of cellulose to glucose using ultra-high temperature and pressure steam explosion", Carbohydrate Polymers 89, 2012, 298-301.
Sasaki et al., "Dissolution and Hydrolysis of Cellulose in Subcritical and Supercritical Water", Industrial & Engineering Chemistry Research, 39(8), 2000, 2883-2890.
Sasaki et al., "Kinetics of cellulose conversion at 25 MPa in sub-and supercritical water", AIChE Journal, 50(1), 2004, 192-202.
Sasaki et al., "Rapid and selective conversion of cellulose to valuable chemical intermediates using supercritical water", Proc. 6th international Symposium on Supercritical Fluids, Tome 2, 2003, 1417-1422.
Sasaki et al., "Super-rapid enzymatic hydrolysis of cellulose with supercritical water solubilization pretreatment", Kobunshi Ronbunshu, 58(10), 2001, 527-532 (Abstract).
Saucedo-Luna et al., "Optimization of acid hydrolysis of bagasse from Agave tequila Weber", Revista Mexicana de Ingenieria Quimica, 9(1), 2010, 91-97 (Abstract).
Schacht et al., "From plant materials to ethanol by means of supercritical fluid technology", J. of Supercritical Fluids, vol. 46, 2008, 299-321.
Schacht, C., et al. 2008. "From plant materials to ethanol by means of supercritical fluid technology," The Journal of Supercritical Fluids, 46, 299-321.
Sera et al., "Development of saccharification techniques for cellulosic biomass", Hitz Giho, 68(2), 2008, 40-45 (Abstract).

(56) References Cited

OTHER PUBLICATIONS

Shikinaka et al., "Polyfunctional nanometric particles obtained from lignin, a woody biomass resource", Green Chemistry, 12(11), 2010, 1914-1916 (Abstract).
Sina et al., "Key Compounds of the Hydropyrolysis of Glucose in Supercritical Water in the Presence of K2CO3", Ind. Eng. Chem. Res., 2003, 42(15), 3516-3521.
Slutier, et al., "Determination of Ash in Biomass", Laboratory Analytical Procedure, National Renewable Energy Laboratory, downloaded from http://www.astm.org/Standards/ E1755.htm, Jul. 17, 2005.
Smit, R., et al. 1997. "A new method for the quantification of condensed and uncondensed softwood lignin structures," Proc. 9th Intern. Symp. Wood Pulping Chem., Montreal, Canada., L4-1-L4-6.
Soederstroem et al., "Effect of Washing on Yield in One- and Two-Step Steam Pretreatment of Softwood for Production of Ethanol", Biotechnology Progress, 20(3), 2004, 744-749 (Abstract).
Sokolov et al., "Activation of hydrolytic lignin obtained from corncobs", Kozharska i Obuvna Promishlenost, 13(6), 1972, 13-23 (Abstract).
Spigno et al., "Cellulose and hemicelluloses recovery from grape stalks", Bioresource Technology, 99(10), 2008, 4329-4337 (Abstract).
Springer, "Prehydrolysis of hardwoods with dilute sulfuric acid", Industrial & Engineering Chemistry Product Research and Development, 24(4), 1985, 614-23 (Abstract).
Srinivasan et al., "Pretreatment of Guayule Biomass Using Supercritical Carbon Dioxide-Based Method", Bioresource Technology, 101(24), 2010, 9785-9791.
Srokol et al., "Hydrothermal upgrading of biomass to biofuel; studies on some monosacchride model compounds", Carbohydrate Research, 339(10), 2004, 1717-1726 (Abstract).
Steinke, "Valve solutions for high-pressure letdown", Proceedings of the Symposium on Instrumentation for the Process Industries, 44th, 1989, 39-43 (Abstract).
Steinke et al., "Valve solutions for high pressure letdown", Advances in Instrumentation, 42(3), 1987, 1381-1390 (Abstract).
Strobel et al., "Carbohydrate Transport by the Anaerobic Thermophile Clostridium thermocellum LQRI", Applied and Environmental Microbiology, Nov. 1995, 4012-4015.
Suitor et al., "Development of a coal slurry letdown valve", American Society of Mechanical Engineers, Fluids Engineering Division, vol. 23, 1985, 142-144 (Abstract).
Sukhanovskii et al., "The chemical composition of the organic part and of ash in hydrolysis lignins", Gidroliznaya i Lesokhimicheskaya Promyshlennost, 18(5), 1965, 15-17 (Abstract).
Sukhanovskii, et al., "The chemical composition of the organic part and of ash in hydrolysis lignins", Gidroliznaya i Lesokhimicheskaya Promyshlennost, 18(5), 1965, 15-17.
Sun, S., et al. 2012. "Sequential extractions and structural characterization of lignin with ethanol and alkali from bamboo (Neosinocalamus affinis)," Industrial Crops and Products, 37(1), 51-60.
Sun, X., et al. 2005. "Physicochemical characterization of lignin isolated with high yield and purity from wheat straw," International Journal of Polymer Analysis and Characterization, 9, 317-337.
Svitel'Skii, "Study of ash in lignin from kraft mill effluents", Mater. Nauch.—Tekh. Konf. Leningrad. Lesotekh. Akad., No. 4, 1966, 180-185 (Abstract).
Svitel'Skii, "Study of ash in lignin from kraft mill effluents", Mater. Nauch.-Tekh. Konf. Leningrad. Lesotekh. Akad., No. 4, 1966, 180-185.
Terol et al., "High-temperature liquid chromatography inductively coupled plasma atomic emission spectrometry hyphenation for the combined organic and inorganic analysis of foodstuffs", Journal of Chromatography, 1217(40), 2010, 6195-6202.
Trickett et al., "Dilute acid hydrolysis of bagasse hemicellulose", ChemSA, 8(3), 1982, 11-15 (Abstract).
U.S. Appl. No. 13/437,264 "Notice of Allowance", dated Nov. 23, 2012, 30 pages.

U.S. Appl. No. 13/479,852, "Notice of Allowance", dated Dec. 5, 2012, 9 pages.
Um et al., "Acid Hydrolysis of Hemicellulose in Green Liquor Pre-Pulping Extract of Mixed Northern Hardwoods", Appl. Biochem Biotechnol,153(1-3), 2009, 127-38.
Van Walsum, "Severity function describing the hydrolysis of xylan using carbonic acid", Applied Biochemistry and Biotechnology, 91-93, 2001, 317-329 (Abstract).
Van Walsum et al., "Carbonic acid enhancement of hydrolysis in aqueous pretreatment of corn stover", Bioresource Technology, 93(3), 2004, 217-226 (Abstract).
Vanderlaan, M. & R. Thring. 1998. "Polyurethanes from Alcell lignin fractions obtained by sequential solvent extraction," Biomass & Bioenergy, 14, 525-531.
Varga et al., "Optimization of steam pretreatment of corn stover to enhance enzymatic digestibility", Applied Biochemistry and Biotechnology, 113-116, 2004, 509-523 (Abstract).
Veres et al., "Studies on matrix effects in the determination of the metal content of sugar complexes by atomic absorption spectrometry", Magyar Kemiai Folyoirat, 93(5), 1987, 199-204 (Abstract).
Vick Roy et al., "Biomass hydrolysis with sulfur dioxide and water in the region of the critical point", Process Technology Proceedings, 3 Supercrit. Flud Technol., 1985, 397-444 (Abstract).
Wallis, A. F. A. 1971. "Solvolysis by acids and bases." In: Lignins: Occurrence, formation, structure and reactions. Sarkanen, K.V., et al., Eds., 345-372.
Wiboonsiriku et al., "Properties of Extracts from Defatted Rice Bran by its Subcritical Water Treatment", Journal of Agricultural and Food Chemistry, 2007, 55(21), 8759-8765.
Wörmeyer, K., et al. 2011. "Comparison of different pretreatment methods for lignocellulisic materials. Part II: Influence of pretreatment on the properties of rye straw lignin," Bioresource Technology, 102, 4157-4164.
Wu et al., "Determination of trace calcium in glucose by Zeeman flame atomic absorption spectrometry", Guangdong Weiliang Yuansu Kexue, 14(3), 2007, 58-60 (Abstract).
Xia, Z., et al. 2001. "Quantitative 13C NMR of lignins with internal standards," Journal of Agricultural and Food Chemistry, 49, 3573-3578.
Yan, Z., et al. 2007. "Supercritical/subcritical technology for pretreatment and hydrolyzation of stalks," Progress in Chemistry, 19(11), 13/45-19/45.
Yang et al., "Steaming extraction of corncob xylan for production of xylooligosaccharide", Wuxi Qinggong Daxue Xuebao, 17(4), 1998, 50-53 (Abstract).
Yee et al., "Improvement of xylose production by acid hydrolysis of bagasse pith with low liquor ratio", Taiwan Tangye Yanjiuso Yanjiu Huibao, 98, 1982, 59-70 (Abstract).
Yoshida et al., "Gasification of Biomass Model Compound and Real Biomass in Supercritical Water", Biomass and Bioenergy, 2004, 26:71-78.
Yu et al., "Characteristics and Precipitation of Glucose Oligomers in the Fresh Liquid Products Obtained from the Hydrolysis of Cellulose in", Hot-Compressed Water, Industrial & Engineering Chemistry Research, 48(23), 2009, 10682-10690 (Abstract).
Zakis, G. 1994. Functional analysis of lignins and their derivatives. Tappi Press, Atlanta, Georgia.
Zawadzki, M. & Ragauskas, A. 2001. "N-Hydroxy compounds as new internal standards for the 31P-NMR determination of lignin hydroxyl functional groups," Holzforschung, 55, 283-285.
Zhang et al., "Cellulose utilization by Clostridium thermocellum: Bioenergetics and hydrolysis product assimilation", PNAS, May 17, 2005, 7321-7325.
Zhang, et al., "Lignocellulosic ethanol residue-based lignin-phenol-formaldehyde resin adhesive", International Journal of Adhesion & Adhesives, vol. 40, 2013, 11-18.
Zhang, et al., "Preparation and properties of lignin-phenol-formaldeyde resins based on different biorefinery residues of agricultural biomass", Industrial Crops and Products, vol. 43, 2013, 326-333.

(56) References Cited

OTHER PUBLICATIONS

Zhang, L. & G. Gellerstedt. 2007. "Quantitative 2D HSQC NMR determination of polymer structures by selecting suitable internal standard references," Magnetic Resonance in Chemistry, 45(1), 37-45.
Zhao et al., "Combined supercritical and subcritical process for cellulose hydrolysis to fermentable hexoses", Environmental Science & Technology, 43(5), 2009, 1565-1570.
Zhao et al., "Fermentable hexose production from corn stalks and wheat straw with combined supercritical and subcritical hydrothermal technology", Bioresource Technology, 100(23), 2009, 5884-5889 (Abstract).
Zhao et al., "Supercritical hydrolysis of cellulose for oligosaccharide production in combined technology", Chemical Engineering Journal, Aug. 1, 2009, 150(2):411-417.
Zhao et al., "Supercritical pretreatment and hydrolysis of cellulose", Huaxue Xuebao, 66(20), 2008, 2295-2301 (Abstract).
Zhuang et al., "Research on biomass hydrolysis under extremely low acids by HPLC", Taiyangneng Xuebao, 28(11), 2007, 1239-1243 (Abstract).
Office Action dated Jul. 22, 2013 for Canadian Application No. 2,806,873, which was filed on May 4, 2012. (Inventor—Kiran Kadam; Applicant—Renmatix) (pp. 1-3).
Notice of Allowance dated Nov. 20, 2013 for for Canadian Application No. 2,806,873, which was filed on May 4, 2012. (Inventor—Kiran Kadam; Applicant—Renmatix) (pp. 1-1).
Extended European Search Report dated Oct. 16, 2014 for EP 12779305.7, which was filed on May 4, 2012 and published as EP 2705111 on Mar. 14, 2014. (Inventor—Kiran Kadam; Applicant—Renmatix) (pp. 1-2).
International Search Report dated Nov. 30, 2012 for International Application No. PCT/US2012/036591, which was filed on May 4, 2012 and published as WO 2012/151524 on Nov. 8, 2012. (Inventor—Kiran Kadam; Applicant—Renmatix). (pp. 1-11).
Written Opinion dated Nov. 30, 2012 for International Application No. PCT/US2012/036591, which was filed on May 4, 2012 and published as WO 2012/151524 on Nov. 8, 2012. (Inventor—Kiran Kadam; Applicant—Renmatix). (pp. 1-6).
Notice of Allowance dated Dec. 3, 2013 for U.S. Appl. No. 13/464,275, filed May 4, 2012 and published as US 2012/0282465 on Nov. 8, 2012. (Inventor—Kiran Kadam; Applicant—Renmatix) (pp. 1-4).
Notice of Allowance dated Oct. 17, 2013 for U.S. Appl. No. 13/464,275, filed May 4, 2012 and published as US 2012/0282465 on Nov. 8, 2012. (Inventor—Kiran Kadam; Applicant—Renmatix) (pp. 1-9).
Response to Non-Final Rejection dated Sep. 20, 2013 for U.S. Appl. No. 13/464,275, filed May 4, 2012 and published as US 2012/0282465 on Nov. 8, 2012. (Inventor—Kadam; Applicant—Renmatix) (pp. 3-7).
Non-Final Rejection dated Jun. 21, 2013 for U.S. Appl. No. 13/464,275, filed May 4, 2012 and published as US 2012/0282465 on Nov. 8, 2012. (Inventor—Kadam; Applicant—Renmatix) (pp. 1-6).
Notice of Allowance dated Jul. 14, 2014 for U.S. Appl. No. 14/045,327, filed Oct. 3, 2013 (Inventor—Kiran Kadam; Applicant—Renmatix) (pp. 1-7).
Response to Non-Final Rejection dated Apr. 3, 2014 for U.S. Appl. No. 14/045,327, filed Oct. 3, 2013 (Inventor—Kiran Kadam; Applicant—Renmatix) (pp. 1-6).
Non-Final Rejection dated Jan. 3, 2014 for U.S. Appl. No. 14/045,327, filed Oct. 3, 2013 (Inventor—Kiran Kadam; Applicant—Renmatix) (pp. 1-13).
International Preliminary Report on Patentability dated Jul. 1, 2014 for International Application No. PCT/US2012/067535, which was filed on Dec. 3, 2012 and published as WO 2013/101397 on Jul. 4, 2013. (Inventor—Srinivas Kilambi; Applicant—Renmatix) (pp. 1-6).
International Search Report and Written Opinion dated Feb. 20, 2013 for International Application No. PCT/US2012/067535, which was filed on Dec. 3, 2012 and published as WO 2013/101397 on Jul. 4, 2013. (Inventor—Srinivas Kilambi; Applicant—Renmatix) (pp. 1-10).
Notice of Allowance dated Apr. 1, 2014 for U.S. Appl. No. 13/472,798, filed May 16, 2012 and published as US 2013/0172540 on Jul. 4, 2013. (Inventor—Srinivas Kilambi; Applicant—Renmatix) (pp. 1-7).
Response to Final Rejection dated Feb. 26, 2014 for U.S. Appl. No. 13/472,798, filed May 16, 2012 and published as US 2013/0172540 on Jul. 4, 2013. (Inventor—Srinivas Kilambi; Applicant—Renmatix) (pp. 1-11).
Final Rejection dated Dec. 3, 2012 for U.S. Appl. No. 13/472,798, filed May 16, 2012 and published as US 2013/0172540 on Jul. 4, 2013. (Inventor—Srinivas Kilambi; Applicant—Renmatix) (pp. 1-29).
Response to Non-Final Rejection dated Oct. 16, 2013 for U.S. Appl. No. 13/472,798, filed May 16, 2012 and published as US 2013/0172540 on Jul. 4, 2013. (Inventor—Srinivas Kilambi; Applicant—Renmatix) (pp. 1-22).
Non-Final Rejection dated Apr. 17, 2013 for U.S. Appl. No. 13/472,798, filed May 16, 2012 and published as US 2013/0172540 on Jul. 4, 2013. (Inventor—Srinivas Kilambi; Applicant—Renmatix) (pp. 1-12).
Non-Final Rejection dated Aug. 7, 2012 for U.S. Appl. No. 13/472,798, filed May 16, 2012 and published as US 2013/0172540 on Jul. 4, 2013. (Inventor—Srinivas Kilambi; Applicant—Renmatix) (pp. 1-9).
International Search Report and Written Opinion dated Jul. 28, 2014 for International Application No. PCT/US2014/029284, which was filed on Mar. 14, 2014 and published as WO 2014/144746 on Sep. 18, 2014. (Inventor—Ewellyn A. Capanema; Applicant—Renmatix) (pp. 1-16).
Office Action dated Nov. 9, 2015 by the Australian Patent Office for application AU 2012362936, filed on Dec. 3, 2012 (Applicant—Renmatix, Inc. // Inventor—Kilambi, et al.) (4 pages).
Written Opinion dated Aug. 14, 2015 for application SG 2014008494, filed on Dec. 3, 2012 (Applicant—Renmatix, Inc. // Inventor—Kilambi, et al.) (11 pages).
Response to Written Opinion dated Jan. 13, 2016 for application SG 2014008494, filed on Dec. 3, 2012 (Applicant—Renmatix, Inc. // Inventor—Kilambi, et al.) (4 pages).
Non-Final Office Action dated Jan. 27, 2015 for U.S. Appl. No. 14/048,935, filed Oct. 8, 2013 (Inventor—Kilambi, et al. // Applicant—Renmatix, Inc.) (18 pages).
Response to Non-Final Office Action dated May 27, 2015 for U.S. Appl. No. 14/048,935, filed Oct. 8, 2013 (Inventor—Kilambi, et al. // Applicant—Renmatix, Inc.) (12 pages).
Final Office Action dated Jun. 19, 2015 for U.S. Appl. No. 14/048,935, filed Oct. 8, 2013 (Inventor—Kilambi, et al. // Applicant—Renmatix, Inc.) (9 pages).
Response to Final Office Action dated Aug. 14, 2015 for U.S. Appl. No. 14/048,935, filed Oct. 8, 2013 (Inventor—Kilambi, et al. // Applicant—Renmatix, Inc.) (13 pages).
Advisory Action dated Aug. 25, 2015 for U.S. Appl. No. 14/048,935, filed Oct. 8, 2013 (Inventor—Kilambi, et al. // Applicant—Renmatix, Inc.) (4 pages).
Notice of Allowance dated Oct. 2, 2015 for U.S. Appl. No. 14/048,935, filed Oct. 8, 2013 (Inventor—Kilambi, et al. // Applicant—Renmatix, Inc.) (7 pages).
Non-Final Office Action dated Jul. 9, 2015 for U.S. Appl. No. 14/213,680, filed Mar. 14, 2014 (Inventor—Capanema, et al. // Applicant—Renmatix, Inc.) (33 pages).
Response to Non-Final Office Action dated Oct. 6, 2015 for U.S. Appl. No. 14/213,680, filed Mar. 14, 2014 (Inventor—Capanema, et al. // Applicant—Renmatix, Inc.) (15 pages).
Final Office Action dated Dec. 1, 2015 for U.S. Appl. No. 14/213,680, filed Mar. 14, 2014 (Inventor—Capanema, et al. // Applicant—Renmatix, Inc.) (14 pages).
Lu et al, "Two-step hydrolysis of Japanese beech as treated by semi-flow hot-compressed water", 2009, J. Wood Sci., vol. 55, pp. 367-375.
Canadian Patent Application No. 2815597, Office Action, dated Sep. 26, 2014.

(56) References Cited

OTHER PUBLICATIONS

International Patent Application No. PCT/US2011/21726, "International Search Report and the Written opinion of the International Searching Authority", dated Jul. 5, 2011, 16 pages.

International Patent Application No. PCT/US2011/021726, "International Preliminary Report on Patentability", dated Aug. 2, 2012, 12 pages.

Second Office Action dated Nov. 14, 2014 for Chinese Patent Application No. 201180011545.7, which was filed on Jan. 19, 2011 and published as CN102859066 on Jan. 2, 2013 (Inventor—Kilambi; Application—Renmatix, Inc.) (pp. 1-12).

Non-Final Office Action dated Sep. 26, 2011 for U.S. Appl. No. 12/504,613, filed Jul. 16, 2009 and granted as U.S. Pat. No. 8,546,560 on Oct. 1, 2013 (Applicant—Renmatix, Inc. // Inventor—Kilambi) (17 pages).

Final Office Action dated Feb. 2, 2012 for U.S. Appl. No. 12/504,613, filed Jul. 16, 2009 and granted as U.S. Pat. No. 8,546,560 on Oct. 1, 2013 (Applicant—Renmatix, Inc. // Inventor—Kilambi) (22 pages).

Non-Final Office Action dated Aug. 2, 2012 for U.S. Appl. No. 12/504,613, filed Jul. 16, 2009 and granted as U.S. Pat. No. 8,546,560 on Oct. 1, 2013 (Applicant—Renmatix, Inc. // Inventor—Kilambi) (24 pages).

Final Office Action dated Jan. 18, 2013 for U.S. Appl. No. 12/504,613, filed Jul. 16, 2009 and granted as U.S. Pat. No. 8,546,560 on Oct. 1, 2013 (Applicant—Renmatix, Inc. // Inventor—Kilambi) (22 pages).

Non-Final Office Action dated Jun. 12, 2015 for U.S. Appl. No. 13/522,918, filed Jul. 18, 2012 (Applicant—Renmatix, Inc. // Inventor—Kilambi) (12 pages).

Final Office Action dated Oct. 16, 2015 for U.S. Appl. No. 13/522,918, filed Jul. 18, 2012 (Applicant—Renmatix, Inc. // Inventor—Kilambi) (12 pages).

Non-Final Office Action dated Sep. 20, 2013 for U.S. Appl. No. 13/964,744, filed Apr. 17, 2013 (Applicant—Renmatix, Inc. // Inventor—Kilambi) (12 pages).

Final Office Action dated Mar. 14, 2014 for U.S. Appl. No. 13/964,744, filed Apr. 17, 2013 (Applicant—Renmatix, Inc. // Inventor—Kilambi) (12 pages).

COMPOSITIONS COMPRISING LIGNIN

CROSS REFERENCE TO RELATED APPLICATIONS

This application is a continuation of U.S. application Ser. No. 14/048,935, filed Oct. 8, 2013, which is a continuation of U.S. application Ser. No. 13/472,798, filed May 16, 2012, now U.S. Pat. No. 8,759,498, which claims the benefit of U.S. Application No. 61/581,865, filed Dec. 30, 2011, the entire disclosures of which are incorporated herein by reference.

FIELD OF THE INVENTION

The present invention generally relates to compositions comprising lignin containing maximum levels of undesirable impurities, such as compounds containing sulfur, nitrogen, or metals.

BACKGROUND OF THE INVENTION

There are a number of processes for converting lignocellulosic biomass into liquid streams of various sugars. Certain preferred processes are based on supercritical water (SCW) or hot compressed water (HCW) technology, which offer several advantages including high throughputs, use of mixed feedstocks, separation of sugars, and avoidance of concentrated acids, microbial cultures, and enzymes. Processes using hot compressed water may have two distinct operations: pre-treatment and cellulose hydrolysis. The pre-treatment process hydrolyzes the hemicellulose component of the lignocellulosic biomass and cellulose hydrolysis (CH) process hydrolyzes the cellulose fibers. The resultant five carbon (C5) and six carbon (C6) sugar streams are recovered separately. The remaining solids, which consist mostly of lignin, are preferably recovered, such as through filtration, and may be used as a fuel to provide thermal energy to the process itself or for other processes. Lignin has the combustion heat of 26.6 KJ/g, and holds highest energy among all natural polymeric compounds that contain carbon, hydrogen and oxygen. In energy, lignin is equivalent to ethanol, which also contains carbon, hydrogen and oxygen, and has the combustion heat of 30 KJ/g. However, for a given volume, lignin's combustion heat is approximately 1.5 times as much as that of ethanol, because of lignin's higher density. http://www.altenergymag.com/emagazine/2009/06/lignin-as-alternative-renewable-fuel/1384). Thus, lignin serves as a useful renewable energy source.

Lignocellulosic biomass contains cellulose, hemicellulose, and lignin, along with minor amounts of proteins, lipids (fats, waxes, and oils) and minerals. About two thirds of the dry mass of cellulosic materials is present as cellulose and hemicellulose with lignin making up the bulk of the remaining dry mass. Lignin is a cross-linked racemic macromolecule with a molecular masse in excess of 10,000 Daltons. It is relatively hydrophobic and aromatic in nature. The degree of polymerization in nature is difficult to measure, since it is fragmented during extraction and the molecule consists of various types of substructures that appear to repeat in a haphazard manner. Different types of lignin have been described depending on the means of isolation. "Lignin and its Properties: Glossary of Lignin Nomenclature," *Dialogue/Newsletters* Volume 9, Number 1, Lignin Institute, July 2001.

There are three monolignol monomers, methoxylated to various degrees: p-coumaryl alcohol, coniferyl alcohol, and sinapyl alcohol. K. Freudenberg & A. C. Nash (eds) (1968). *Constitution and Biosynthesis of Lignin*. Berlin: Springer-Verlag. These lignols are incorporated into lignin in the form of the phenylpropanoids p-hydroxyphenyl (H), guaiacyl (G), and syringal (S), respectively. W. Boerjan, J. Ralph, M. Baucher (June 2003). "Lignin bios". *Ann. Rev. Plant Biol.* 54 (1): 519-549. Gymnosperms have a lignin that consists almost entirely of G with small quantities of H. That of dicotyledonous angiosperms is more often than not a mixture of G and S (with very little H), and monocotyledonous lignin is a mixture of all three. Id. Many grasses have mostly G, while some palms have mainly S. All lignins contain small amounts of incomplete or modified monolignols, and other monomers are prominent in non-woody plants. J. Ralph, et al. (2001). "Elucidation of new structures in lignins of CAD- and COMT-deficient plants by NMR." *Phytochem.* 57 (6): 993-1003.

Impurities may be introduced into lignin via processing of the lignocellulosic biomass. Since lignin compositions may be used as a fuel in the SCW or HCW process or other processes, they preferably have a low level of contaminants or impurities that contribute to health, environmental, and safety concerns. For example, it is highly desirable to have no or only a low level of compounds containing sulfur in the lignin composition, as the presence of sulfur may contribute to SOx emissions, when the lignin is combusted. In other applications, low levels of sulfur may also be desirable if lignin is chemically converted through a catalytic process to a downstream product or a derivative. Low levels of sulfur within the final product may also be desirable from product acceptance criteria, or low levels of sulfur may help prevent premature catalyst deactivation for such chemical conversions.

Accordingly, the invention is directed to lignin compositions having low levels of impurities, as well as other important ends.

SUMMARY OF THE INVENTION

In one embodiment, the invention is directed to compositions, comprising:
lignin; and
less than about 2000 mg in total per kg of said lignin of elements;
wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In some embodiments, the compositions further comprise less than about 700 mg of calcium per kg of said lignin. In other embodiments, the compositions further comprise less than about 525 mg of iron per kg of said lignin. In yet other embodiments, the compositions further comprise less than about 150 mg of sulfur per kg of said lignin. In some embodiments, the compositions further comprise less than about 20 g of ash per kg of said lignin. In other embodiments, the compositions comprise less than about 2000 mg of nitrogen per kg of said lignin. In yet other embodiments, the compositions further comprise a weight ratio of the total mass of hydrogen and nitrogen to carbon of less than about 0.110.

In other embodiments, the invention is directed to compositions, comprising:
lignin;
less than about 700 mg of calcium per kg of said lignin;
less than about 525 mg of iron per kg of said lignin; and
less than about 150 mg of sulfur per kg of said lignin.

In some embodiments, the compositions comprise less than about 2000 mg in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In yet other embodiments, the invention is directed to compositions, comprising:
lignin; and
less than about 700 mg of calcium per kg of said lignin.
In some embodiments, the compositions comprise less than about 2000 mg in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In yet further embodiments, the invention is directed to compositions, comprising:
lignin; and
less than about 525 mg of iron per kg of said lignin.
In some embodiments, the compositions comprise less than about 2000 mg in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In yet another embodiment, the invention is directed to compositions, comprising:
lignin; and
less than about 150 mg of sulfur per kg of said lignin.
In some embodiments, the compositions comprise less than about 2000 mg in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

DETAILED DESCRIPTION OF THE INVENTION

As employed above and throughout the disclosure, the following terms, unless otherwise indicated, shall be understood to have the following meanings.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, the phrase "substantially free" means have no more than about 1%, preferably less than about 0.5%, more preferably, less than about 0.1%, by weight of a component, based on the total weight of any composition containing the component.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including hardwoods, softwoods, sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, $C_5$ saccharides (including hemicellulose, $C_5$ oligosaccharides, and $C_5$ monosaccharides), and mixtures thereof.

As used herein, "ash" refers to the non-aqueous residue that remains after a sample is burned, and consists mostly of metal oxides. Ash content may be measured in accordance with ASTM Standard Method No. E1755-01 "Standard Method for the Determination of Ash in Biomass." This test method covers the determination of ash, expressed as the percentage of residue remaining after dry oxidation at 550 to 600° C. All results are reported relative to the 105° C. oven dry weight of the sample." See also: http://www.nrel.gov/biomass/pdfs/42622.pdf and http://www.astm.org/Standards/E1755.htm, which are both incorporated herein by reference in their entirety.

Accordingly, in one embodiment, the invention is directed to compositions, comprising:
lignin; and
less than about 2000 mg, preferably less than about 1775 mg, in total per kg of said lignin of elements;
wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In other embodiments, the invention is directed to compositions, comprising:
lignin;
less than about 700 mg, preferably less than about 675 mg, of calcium per kg of said lignin;
less than about 525 mg, preferably less than about 505 mg, of iron per kg of said lignin; and
less than about 150 mg, preferably less than about 147 mg, of sulfur per kg of said lignin.

In some embodiments, the compositions comprise:
lignin; and
less than about 700 mg, preferably less than about 675 mg, of calcium per kg of said lignin.

In some embodiments, the compositions comprise:
lignin; and
less than about 525 mg, preferably less than about 505 mg, of iron per kg of said lignin.

In some embodiments, the compositions comprise:
lignin; and
less than about 150 mg, preferably less than about 147 mg, of sulfur per kg of said lignin.

In some embodiments, the compositions comprise less than about 2000 mg, preferably less than 1775 mg, in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In some embodiments, the compositions further comprise less than about 700 mg, preferably less than about 675 mg, of calcium per kg of said lignin. In other embodiments, the compositions further comprise less than about 525 mg of iron per kg of said lignin. In yet other embodiments, the compositions further comprise less than about 150 mg of sulfur per kg of said lignin.

In some embodiments, the lignin has a heating value as measured by ASTM-D240 and D5865 of at least about 5,000 BTU/lb, preferably at least about 7,500 BTU/lb, and more preferably, at least about 8,000 BTU/lb.

In some embodiments, the lignin has an average particle size less than about 500 microns. In preferred embodiments, the lignin has an average unaggregated particle size less than about 100 microns. In other preferred embodiments, the lignin has an average unaggregated particle size less than about 60 microns.

In some embodiments, the lignin has a bulk density of less than about 0.35 g/cc, depending upon particle size.

In some embodiments, the lignin is processed from lignocellulosic biomass optionally using supercritical, subcritical, or near critical fluid extraction or combinations thereof.

In some embodiments, the composition is substantially free of organic solvent.

In some embodiments, the lignin is in a powdered form. In other embodiments, the lignin is in a pelletized form. In yet other embodiments, the lignin is in a liquid form. In addition, the lignin may be in combination of these forms.

In some embodiments, is present at a level of at least 30% by weight, based on the total weight of the composition, as measured by pyrolysis molecular beam mass spectrometry.

In some embodiments, the weight ratio of syringyl monolignol to guaiacyl monolignol is about 2.0 to about 3.0, as measured by pyrolysis molecular beam mass spectrometry.

In some embodiments, the compositions further comprise less than about 700 mg, preferably less than about 675 mg, of calcium per kg of said lignin.

In some embodiments, the compositions further comprise less than about 525 mg, preferably less than about 505 mg, of iron per kg of said lignin.

In some embodiments, the compositions further comprise less than about 150 mg, preferably less than about 147 mg, of sulfur per kg of said lignin.

In some embodiments, the levels of said elements are measured by inductively coupled plasma emission spectroscopy.

In some embodiments, the compositions further comprise less than about 20 g of ash per kg of said lignin, preferably less than about 17.5 g of ash per kg of said lignin.

In other embodiments, the compositions comprise less than about 2000 mg of nitrogen per kg of said lignin, preferably less than about 1900 mg of nitrogen per kg of said lignin. Nitrogen may be measured by thermal conductivity detection after combustion and reduction.

In yet other embodiments, the compositions further comprise a weight ratio of the total mass of hydrogen and nitrogen to carbon of less than about 0.110, preferably less than about 0.105. Carbon, hydrogen, and nitrogen levels may be measured by thermal conductivity detection after combustion and reduction.

In certain other embodiments, the compositions comprising the lignin further comprise less than a maximum of any of the elements, individually or in combination, in the table listed below:

| Element | Level less than about (mg of element/kg of lignin) |
| --- | --- |
| Al | 50 |
| As | 16 |
| B | 3.25 |
| Ba | 3.7 |
| Be | 0.04 |
| Cd | 0.850 |
| Co | 1.25 |
| Cr | 2.0 |
| Cu | 20.0 |
| K | 45.0 |
| Li | 0.310 |
| Mg | 22.5 |
| Mn | 7.00 |
| Mo | 3.00 |
| Na | 61.5 |
| Ni | 1.50 |
| P | 115 |
| Pb | 10.00 |

-continued

| Element | Level less than about (mg of element/kg of lignin) |
|---------|---------------------------------------------------|
| Sb      | 9.50                                              |
| Se      | 21.0                                              |
| Si      | 65.0                                              |
| Sn      | 11.00                                             |
| Sr      | 2.25                                              |
| Ti      | 6.00                                              |
| Tl      | 21.0                                              |
| V       | 0.350                                             |
| Zn      | 11.5                                              |

In further embodiments, the compositions further comprise less than about 0.5% by weight, based on the total weight of said lignin, of organic solvent, such as alcohols, including water miscible lower aliphatic $C_1$-$C_4$ alcohols (e.g., methanol, ethanol, isopropanol, t-butanol). In preferred embodiments, the compositions contain less than about 0.1% by weight, based on the total weight of said lignin of organic solvent. In more preferred embodiments, the compositions contain substantially no organic solvent.

The compositions of the invention are preferably prepared from biomass by processes employing supercritical, subcritical, and/or near critical water, preferably without the addition of acid. The processes may include pretreatment step or steps using supercritical or near critical water to separate the C5 sugars (monomers and/or oligomers) from cellulose and lignin. In the pretreatment step, suitable temperatures are about 130° C. to about 250° C., suitable pressures are about 4 bars to about 100 bars, and suitable residence times are about 0.5 minutes to about 5 hours. The processes may also include a cellulose hydrolysis step or steps using supercritical or near critical water to separate the cellulose (which may processed to form C6 monomeric and/or oligomeric sugars) from the lignin. In the hydrolysis step(s), suitable temperatures are about 250° C. to about 450° C., suitable pressures are about 40 bars to about 260 bars, and suitable residence times are about 0.1 seconds to about 3 minutes.

The compositions of the invention may be prepared in any suitable reactor, including, but not limited to, a tubular reactor, a digester (vertical, horizontal, or inclined), or the like. Suitable digesters include the digester system described in U.S. Pat. No. 8,057,639, which include a digester and a steam explosion unit, the entire disclosure of which is incorporated by reference.

The compositions of the invention comprising lignin may be utilized in a variety of applications, including, but not limited to, fuels, tackifiers, phenol formaldehyde resin extenders in the manufacture of particle board and plywood, in the manufacture of molding compounds, urethane and epoxy resins, antioxidants, controlled-release agents, flow control agents, cement/concrete mixing, plasterboard production, oil drilling, general dispersion, tanning leather, road covering, vanillin production, dimethyl sulfide and dimethyl sulfoxide production, phenol substitute in phenolic resins incorporation into polyolefin blends, aromatic (phenol) monomers, additional miscellaneous monomers, carbon fibers, metal sequestration in solutions, basis of gel formation, polyurethane copolymer—as a renewable filler/extender, and the like.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1: Preparation of Lignin Compositions

Lignin compositions of the invention were prepared using supercritical, subcritical, and near critical water extraction in a two stage process. Particulate lignocellulosic biomass consisting of mixed hardwood chips of 140 mesh or less was mixed with water to form a slurry (about 20% by weight solids). The slurry was heated to a temperature of about 170-245° C. and then feed into a pretreatment reactor for about 1-120 minutes under sufficient pressure to keep the water in the liquid phase. The pretreated slurry was then cooled to a temperature less than about 100° C. under little (less than about 10 bar) or no pressure. The pretreated solids were then separated from the liquid stream using a filter press. Alternatively, the solids may be separated using a centrifugal filter pressor. The pretreated solids were then mixed with water to form a slurry and the slurry was heated to a temperature of about 150-250° C. The slurry was then subjected to supercritical water at about 374-600° C. in a hydrolysis reactor for about 0.05-10 seconds under a pressure of about 230-300 bar. After exiting the hydrolysis reactor, the hydrolyzed slurry was quenched with water and then flashed to about ambient temperature and pressure to remove water. The lignin solids were then separated from the liquid stream using a centrifugal decanter and air dried.

Example 2: Analysis of Lignin Compositions Using Inductively Coupled Plasma

The dried compositions containing the lignin of Example 1 were analyzed using inductively coupled plasma emission spectroscopy. The results are shown in the table below:

| ICP element | | Sample A Reported Conc. (mg/kg) | | Duplicate Reported Conc. (mg/kg) | | Sample B Reported Conc. (mg/kg) | | Duplicate Reported Conc. (mg/kg) | | Sample C Reported Conc. (mg/kg) | | Duplicate Reported Conc. (mg/kg) | Average |
|---|---|---|---|---|---|---|---|---|---|---|---|---|---|
| Al |   | 45.5   |   | 47.8   |   | 39.1   |   | 37.5   |   | 43.6   |   | 40.4   | 42.3 |
| As | < | 12.6   | < | 14.6   | < | 12.1   | < | 12.5   | < | 13.6   | < | 15.6   | 13.5 |
| B  |   | 3.22   |   | 0.777  |   | 2.88   |   | 1.66   |   | 0.603  | < | 0.605  | 1.6  |
| Ba |   | 3.34   |   | 3.62   |   | 2.99   |   | 2.99   |   | 3.02   |   | 2.77   | 3.1  |
| Be | < | 0.0300 | < | 0.0349 | < | 0.0288 | < | 0.0299 | < | 0.0326 | < | 0.0374 | 0.0  |
| Ca |   | 618    |   | 671    |   | 551    |   | 535    |   | 594    |   | 545    | 585.7 |

-continued

| ICP element | Sample A Reported Conc. (mg/kg) | | Duplicate Reported Conc. (mg/kg) | | Sample B Reported Conc. (mg/kg) | | Duplicate Reported Conc. (mg/kg) | | Sample C Reported Conc. (mg/kg) | | Duplicate Reported Conc. (mg/kg) | | Average |
|---|---|---|---|---|---|---|---|---|---|---|---|---|---|
| Cd | < | 0.667 | < | 0.777 | < | 0.640 | < | 0.665 | < | 0.724 | < | 0.830 | 0.7 |
| Co | < | 0.972 | < | 1.13 | < | 0.933 | < | 0.969 | < | 1.05 | < | 1.21 | 1.0 |
| Cr | | 1.56 | | 1.94 | | 1.60 | | 1.66 | | 1.33 | | 1.38 | 1.6 |
| Cu | | 5.89 | | 8.80 | | 7.26 | | 7.87 | | 6.64 | | 19.0 | 9.2 |
| Fe | | 465 | | 501 | | 313 | | 298 | | 351 | | 320 | 374.6 |
| K | | 39.1 | | 40.4 | | 23.7 | | 31.1 | | 33.1 | | 44.1 | 35.3 |
| Li | < | 0.245 | < | 0.285 | < | 0.235 | < | 0.244 | < | 0.266 | < | 0.304 | 0.3 |
| Mg | | 21.9 | | 22.1 | | 18.8 | | 19.0 | | 18.6 | | 19.8 | 20.0 |
| Mn | | 5.89 | | 6.47 | | 5.02 | | 4.99 | | 4.34 | | 4.01 | 5.1 |
| Mo | < | 2.34 | < | 2.72 | < | 2.25 | < | 2.33 | < | 2.54 | < | 2.91 | 2.5 |
| Na | | 58.7 | | 52.0 | | 54.6 | | 40.7 | | 50.6 | | 61.0 | 52.9 |
| Ni | < | 1.16 | < | 1.35 | < | 1.12 | < | 1.16 | < | 1.26 | < | 1.45 | 1.3 |
| P | < | 89.9 | < | 105 | < | 86.2 | < | 89.6 | < | 97.5 | < | 112 | 96.6 |
| Pb | < | 7.95 | < | 9.25 | < | 7.63 | < | 7.92 | < | 8.63 | < | 9.89 | 8.5 |
| S | | 105 | | 132 | | 146 | | 128 | | 128 | | 103 | 123.6 |
| Sb | < | 7.46 | < | 8.68 | < | 7.16 | < | 7.43 | < | 8.09 | < | 9.28 | 8.0 |
| Se | < | 16.5 | < | 19.2 | < | 15.9 | < | 16.5 | < | 18.0 | < | 20.6 | 17.8 |
| Si | | 54.9 | | 63.9 | | 42.1 | | 57.2 | | 67.6 | | 64.5 | 58.4 |
| Sn | | 9.23 | | 9.19 | | 7.04 | | 7.65 | | 10.9 | | 10.1 | 9.0 |
| Sr | | 2.11 | | 2.20 | | 1.81 | | 1.77 | | 1.93 | | 1.80 | 1.9 |
| Ti | | 3.56 | | 5.57 | | 2.77 | | 5.87 | | 3.26 | | 3.46 | 4.1 |
| Tl | < | 16.7 | < | 19.5 | < | 16.1 | < | 16.7 | < | 18.2 | < | 20.8 | 18.0 |
| V | < | 0.260 | < | 0.303 | < | 0.250 | < | 0.332 | < | 0.282 | < | 0.324 | 0.3 |
| Zn | | 9.79 | | 11.0 | | 9.28 | | 9.86 | | 7.48 | | 6.37 | 9.0 |
| Total Elements | | 1610.3 | | 1762.1 | | 1378.7 | | 1347.2 | | 1496.6 | | 1441.4 | 1506.0 |

Example 3: Analysis of Lignin for Carbon, Hydrogen, and Nitrogen

Dried compositions containing lignin were analyzed to determine the levels of ash, carbon, hydrogen, and nitrogen by thermal conductivity detection after combustion and reduction. The results are shown in the table below:

| Element/Material | Sample 1 | Sample 2 |
|---|---|---|
| C | 56.76% | 57.09% |
| H | 5.46% | 5.66% |
| N | 0.18% | 0.19% |
| Ash | 1.1% | 1.1% |
| Ratio of N + H:C | 0.099 | 0.102 |

Example 4: Lignin Characterization

The NREL method for lignin (acid hydrolysis followed by gravimetric protocol in accordance with standard NREL procedures found at http://www.nrel.gov/biomass/pdfs/42618.pdf and pyrolysis molecular beam mass spectrometry (py-MBMS) were used to quantify the level of lignin in the solids, using lignin from hardwood as a standard. The results are shown in the table below:

| Sample | Lignin Weight % from NREL Method | Lignin Weight % from py-MBMS Method | Syringyl/Guaiacyl Weight Ratio from py-MBMS Method |
|---|---|---|---|
| Hardwood standard | 28 | 23.3 | 2.6 |
| Pretreated solids | 40-44 | 21.6 | 2.4 |
| Solid residue after supercritical hydrolysis | >50 | 33.3 | 2.5 |

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A phenolic resin:
    wherein at least a portion of said phenolic resin is produced by a reaction with a phenol substitute;
    wherein said phenol substitute comprises:
        lignin; and
        wherein said phenol substitute is a composition produced by a two stage process, said two stage process comprising:
        a first stage comprising:
            providing a mixture comprising lignocellulosic biomass and water; and heating said mixture to a first temperature of about 130° C. to about 250° C. and maintaining said first temperature for a period of about 0.5 min to about 5 hours, thereby producing a first solids fraction and a first liquid fraction; and a second stage comprising:
subjecting said first solids fraction obtained from said first stage to a supercritical or near-critical fluid under a pressure of about 40 bar to about 300 bar;
wherein said supercritical or near-critical fluid comprises water;
wherein said supercritical or near-critical fluid is at a temperature of about 374° C. to about 600° C.;
wherein said subjecting step elevates said first solids fraction to a second temperature of about 250° C. to about 450° C.;
wherein said first solids fraction is maintained at said second temperature for a period of about 0.05 sec to about 10 sec, thereby producing a second solids fraction and a second liquid fraction; and
wherein said composition comprises said second solids fraction.

2. The phenolic resin of claim 1, wherein said lignin has an average particle size less than about 500 microns.

3. The phenolic resin of claim 1, wherein said first stage employs a pressure of about 4 bar to about 100 bar.

4. The phenolic resin of claim 1, wherein said second stage employs a pressure of about 40 bar to about 260.

5. The phenolic resin of claim 1, wherein said phenol substitute comprises less than about 150 mg of sulfur per kg of said lignin.

6. The phenolic resin of claim 1, wherein said second stage employs supercritical water.

7. The phenolic resin of claim 1, wherein said composition is prepared without the addition of acid.

8. The phenolic resin of claim 1, wherein said lignin is present in said phenol substitute at a level of at least 30% by weight, based on the total weight of said phenol substitute, as measured by pyrolysis molecular beam mass spectrometry; or
wherein said lignin is present in said phenol substitute in an amount greater than about 50 wt. %, based on the weight of said phenol substitute, as measured by NREL procedures.

9. The phenolic resin of claim 1, wherein said first stage employs a digester and a steam explosion unit.

10. A phenol formaldehyde resin comprising:
a reaction product of phenol and formaldehyde; and
an extender, wherein said extender comprises:
lignin; and
wherein said extender is a composition produced by a two stage process, said two stage process comprising:
a first stage comprising:
providing a mixture comprising lignocellulosic biomass and water; and
heating said mixture to a first temperature of about 130° C. to about 250° C. and maintain said first temperature for a period of about 0.5 min to about 5 hours, thereby producing a first solids fraction and a first liquid fraction; and a second stage comprising:
subjecting said first solids obtained from said first stage to a supercritical or near-critical fluid under a pressure of about 40 bar to about 300 bar;
wherein said supercritical or near-critical fluid comprises water;
wherein said supercritical or near-critical fluid is at a temperature of about 374° C. to about 600° C.;
wherein said subjecting step elevates said first solids fraction to a second temperature of about 250° C. to about 450° C.;
wherein said first solids fraction is maintained at said second temperature for a period of about 0.05 sec to about 10 sec, thereby producing a second solids fraction and a second liquid fraction; and
wherein said composition comprises said second solids fraction.

11. The phenol formaldehyde resin of claim 10, wherein said lignin has an average particle size less than about 500 microns.

12. The phenol formaldehyde resin of claim 10, wherein said first stage employs a pressure of about 4 bar to about 100 bar.

13. The phenol formaldehyde resin of claim 10, wherein said second stage employs a pressure of about 40 bar to about 260 bar.

14. The phenol formaldehyde resin of claim 10, wherein said extender comprises less than about 150 mg of sulfur per kg of said lignin.

15. The phenol formaldehyde resin of claim 10, wherein said second stage employs supercritical water.

16. The phenol formaldehyde resin of claim 10, wherein said composition is prepared without the addition of acid.

17. The phenol formaldehyde resin of claim 10, wherein said lignin is present in said extender at a level of at least 30% by weight, based on the total weight of said extender, as measured by pyrolysis molecular beam mass spectrometry; or
wherein said lignin is present in said extender in an amount greater than about 50 wt. %, based on the weight of said extender, as measured by NREL procedures.

18. The phenol formaldehyde resin of claim 10, wherein said first stage employs a digester and a steam explosion unit.

19. Plywood or a particle board comprising the phenolic resin of claim 1.

20. Plywood or a particle board comprising the phenol formaldehyde resin of claim 10.

21. The phenolic resin of claim 1, wherein said second stage employs a pressure of about 230 bar to about 300 bar.

22. The phenol formaldehyde resin of claim 10, wherein said second stage employs a pressure of about 230 bar to about 300 bar.

* * * * *